US010643098B2

(12) United States Patent
De Jeu et al.

(10) Patent No.: US 10,643,098 B2
(45) Date of Patent: May 5, 2020

(54) METHOD AND SYSTEM FOR IMPROVING THE RESOLUTION OF SENSOR DATA

(71) Applicant: Vandersat B.V., Noordwijk (NL)

(72) Inventors: Richard Adrianus Maria De Jeu, Noordwijk (NL); Anna Helena Alida De Nijs, Noordwijk (NL); Michel Hendricus Wilibrord Van Klink, Noordwijk (NL)

(73) Assignee: Vandersat B.V., Noordwijk (NL)

( * ) Notice: Subject to any disclaimer, the term of this patent is extended or adjusted under 35 U.S.C. 154(b) by 0 days.

(21) Appl. No.: 16/308,741

(22) PCT Filed: Jun. 13, 2017

(86) PCT No.: PCT/EP2017/064449
§ 371 (c)(1),
(2) Date: Dec. 10, 2018

(87) PCT Pub. No.: WO2017/216186
PCT Pub. Date: Dec. 21, 2017

(65) Prior Publication Data
US 2019/0347506 A1 Nov. 14, 2019

(30) Foreign Application Priority Data
Jun. 13, 2016 (EP) .................................... 16174190

(51) Int. Cl.
*G06K 9/00* (2006.01)
*G06K 9/46* (2006.01)
*G06T 5/00* (2006.01)
(52) U.S. Cl.
CPC ......... *G06K 9/4647* (2013.01); *G06K 9/0063* (2013.01); *G06T 5/003* (2013.01); *G06T 2207/30181* (2013.01)

(58) Field of Classification Search
CPC .................................................. G06K 9/4647
(Continued)

(56) References Cited

PUBLICATIONS

"Disaggregation of SMOS Soil Moisture in Southeastern Australia" by O. Merlin, C. Rudiger, A. Al Sitar, P. Richaume, J.P. Walker, and Y.H. Kerr (IEEE Transactions on Geoscience and Remote Sensing vol. 50, Issue: 5, pp. 1556-1571), 2012.

(Continued)

*Primary Examiner* — Stephen P Coleman
(74) *Attorney, Agent, or Firm* — Steven M. Koehler; Westman, Champlin & Koehler, P.A.

(57) ABSTRACT

The invention relates to a system (51) for improving the spatial resolution of sensor data. The system comprises at least one receiver (53) and at least one processor (55). The at least one receiver (53) is configured to receive a sensor data set and a map. Each element of the sensor data set comprises a sensor footprint identifier allowing a sensor footprint to be identified and a brightness temperature measured for the sensor footprint. The map defines for each of a plurality of geographical areas whether it belongs to one of the first class and the second class. The first class represents a land type and the second class represents a water type. The geographical area is smaller than the sensor footprint. The at least one processor (55) is configured to determine for each element of the sensor data set received using the at least one receiver (53) a brightness temperature for each of at least two classes including the first class and the second class based on the map received using the at least one receiver (53) and to determine a brightness temperature for a specific geographical area of the map based on brightness temperatures associated with a plurality of footprints if the specific geographical area belongs to the first class and based on a brightness temperature determined for the second class if the specific geographical area belongs to the second class. Each (Continued)

of the plurality of footprints covers the specific geographical area.

18 Claims, 15 Drawing Sheets

(58) Field of Classification Search
USPC .......................................................... 382/113
See application file for complete search history.

(56) References Cited

PUBLICATIONS

Global Change Observation Mission—Water "Shizuku" (GCOM-W1), Tokyo, Japan, 2012.
Zhang, Scale in Spatial information and Analysis, CRC, 2014, p. 201-225.
Pages 2-11 2-12, and 4-11 of the AMSR-E Data Users Handbook, 4th Edition, Mar. 2006.
International Preliminary Report an Patentability for International patent application No. PCT/EP2017/064449, dated Sep. 7, 2018.
"Chapter 2 Estimation of Soil Water Conditions Using Passive Microwave Remote Sensing" In: N. Baghadi et al: "Land Surface Remote Sensing in Continental Hydrology", Jan. 1, 2016 (Jan. 1, 2016), Elsevier, XP008182310, ISBN: 978-1-78548-104-8 pp. 41-78, [retrieved on Sep. 23, 2016] Section 2.5; p. 61, last paragraph—p. 63, last paragraph.
Venkat Lakshmi, "Remote Sensing of the Terrestrial Water Cycle", Jan. 1, 2015 (Jan. 1, 2015), Wiley, XP055321376, pp. 278-304.
Nina Maass et al: "Improving passive microwave sea ice concentration algorithms for coastal areas: applications to the Baltic Sea", Tellus A, vol. 62A, No. 4, Jul. 8, 2010 Jul. 8, (2010), pp. 393-410.
Tim Bellerby et al: "Retrieval of Land and Sea Brightness Temperatures from Mixed Coastal Pixels in Passive Microwave Data", IEEE Transactions on Geoscience and Remote Sensing, IEEE Service Center, Piscataway, NJ, US, vol. 36, No. 6, Nov. 1, 1998 (Nov. 1, 1998).
Liu Xiaojing et al: "Downscaling microwave brightness temperatures from FY3B/MWRI with a linear unmixing method", 2016 IEEE International Geoscience and Remote Sensing Symposium Jul. 10, 2016 (Jul. 10, 2016), pp. 2830-2833.
Gu Lingjia et al: "Snow depth and snow cover retrieval from FengYun3B microwave radiation imagery based on a snow passive microwave unmixing method in Northeast China", Journal of Applied Remote Sensing, Society of Photo-Optical Instrumentation Engineers, 1000 20th St. Bellingham WA 98225-6705 USA, vol. 8, No. 1, Jan. 1, 2014 (Jan. 1, 2014).
International Search Report dated Feb. 7, 2018 for corresponding International Application No. PCT/EP2017/064449, filed Jun. 13, 2017.
Written Opinion of the International Searching Authority dated Feb. 7, 2018 for corresponding International Application No. PCT/EP2017/064449, filed Jun. 13, 2017.

METHOD AND SYSTEM FOR IMPROVING THE RESOLUTION OF SENSOR DATA

BACKGROUND OF THE INVENTION

There are multiple ways in which soil moisture can be determined: use of in-situ soil moisture sensors, through hydrological modeling and by using satellite observations. Well-known satellite missions which were specifically designed for soil moisture derivations are the Soil Moisture and Ocean Salinity (SMOS) satellite, which is part of ESA's Living Planet Program and NASA's Soil Moisture Active Passive (SMAP) mission. The raw microwave brightness temperature data as observed by these satellites as well as the derived soil moisture data are made available by both ESA and NASA. Multiple techniques have been developed to improve the spatial resolution of the temperature data and soil moisture data, e.g. by using disaggregation.

Disaggregation based on Physical And Theoretical scale Change (DisPATCh) is an algorithm dedicated to the disaggregation of soil moisture observations using high-resolution soil temperature data. As described in "Disaggregation of SMOS Soil Moisture in Southeastern Australia" by O. Merlin, C. Rudiger, A. Al Bitar, P. Richaume, J. P. Walker, and Y. H. Kerr (IEEE Transactions on Geoscience and Remote Sensing Volume 50, Issue: 5, pages 1556-1571), DisPATCh converts soil temperature fields into soil moisture fields given a semi-empirical soil evaporative efficiency model and a first-order Taylor series expansion around the field-mean soil moisture. DisPATCh improves the resolution of lower resolution soil moisture data, e.g. of ESA's SMOS (Soil Moisture and Ocean Salinity) satellite, with the use of soil temperature data of, for example, MODIS (MODerate-resolution Imaging Spectroradiometer) VIS/IR data from one of the Terra or Aqua satellites. This results in soil moisture data with a resolution of 1 km×1 km.

A drawback of the DisPATCh algorithm is that the resolution is still relatively coarse at 1 km×1 km, in particular this is too coarse for local field applications.

SUMMARY OF THE INVENTION

A method of improving the resolution of sensor data comprises the steps of a processor determining for each element of a sensor data set a brightness temperature for a first class of at least two classes and a brightness temperature for a second class of said at least two classes based on a map, said each element of said sensor data set comprising a sensor footprint identifier allowing a sensor footprint to be identified and a brightness temperature measured for said sensor footprint and said map defining for each of a plurality of geographical areas whether it belongs to one of said first class and said second class, said first class representing a land type, said second class representing a water type and said geographical area being smaller than said sensor footprint, and a processor determining a brightness temperature for a specific geographical area of said map based on brightness temperatures associated with a plurality of footprints if said specific geographical area belongs to said first class, each of said plurality of footprints covering said specific geographical area, and based on a brightness temperature determined for said second class if said specific geographical area belongs to said second class. Said method may be performed by software running on a programmable device. This software may be provided as a computer program product. The sensor footprint may be ellipse-shaped, for example. The sensor data may originate from a satellite sensor or drone sensor, for example. The geographical area may be the smallest element of the map (sometimes referred to as "pixel"), for example.

The inventors have recognized that by combining temperature brightness measurements from a sensor for relatively coarse sensor footprints with a map of a higher resolution specifying at least whether a geographical area of said map is of a land type or a water type, it is possible to distinguish between the temperature brightness of a first geographical area of a land type and a second geographical area of a land type that are part of the same sensor footprint, thereby improving the resolution of the sensor data. This makes it possible to improve the resolution of the sensor data to a resolution of 100 m×100 m. Temperature brightness values can be used to determine soil moisture, for example. The fact that the method starts with (raw) brightness temperatures instead of the coarse scale soil moisture data as provided by the space agencies (e.g. ESA, NASA) is a further reason for the good results of the present invention. This coarse scale soil moisture data is of limited use along the coastline and close to large waterbodies, for example. As a further advantage, the method does not require additional optical satellite information (e.g. from MODIS), like the DisPATCh algorithm, which would have limited the method's use during clouding conditions.

The method may further comprise the step of a processor dividing a sensor footprint into a plurality of ellipses. The surface area between each two neighboring ones of said plurality of ellipses may contribute the same amount to a brightness temperature measured for said sensor footprint.

The step of a processor dividing a sensor footprint into a plurality of ellipses may further comprise a processor determining a plurality of derived footprints from said plurality of ellipses, each of said plurality of derived footprints contributing a different amount to said brightness temperature measured for said sensor footprint.

These derived footprints may be used, amongst others, as follows:

a. A processor determining said brightness temperature for said specific geographical area of said map based on said brightness temperatures associated with said plurality of footprints if said specific geographical area belongs to said first class may comprise a processor assigning a higher weight to a brightness temperature associated with a smaller footprint and a smaller weight to a brightness temperature associated with a larger footprint. In this way, derived footprints may be used (possibly along with the sensor footprints themselves) to determine the temperature brightness of map elements of a land type. This results in more accurate brightness temperatures than when (only) the sensor footprints are used, especially because footprints with a higher contribution to the measured brightness temperature have a higher weight.

b. The step of a processor determining for each element of said sensor data set said brightness temperature for said first class and said brightness temperature for said second class may comprise a processor determining, for a specific element of said sensor data set, a percentage of geographical areas of said map both belonging to said first class and being covered by at least one footprint associated with said specific element and a percentage of geographical areas of said map both belonging to said second class and being covered by said at least one footprint associated with said specific element, wherein a geographical area only present in a smaller footprint has a higher weight than a geographical area present in a larger footprint in determining said percentages. In this way, derived footprints may be used (possibly along with the sensor footprints themselves) to determine a percentage of each element of the sensor data set belonging to the first class and a percentage of each element of the sensor data set belonging to the second class, which percentages in turn may be used to determine the brightness temperature for the first class and the brightness temperature for the second class for each element of the sensor data set.

The latter may involve, for example, a processor determining for said specific element of said sensor data set, for each of said at least one footprint, a percentage of geographical areas belonging to said first class which are covered by a footprint and a percentage of geographical areas belonging to said second class which are covered by said footprint and optionally a processor determining for said specific element of said sensor data set from said percentages determined for each of said at least one footprint an average percentage of geographical areas belonging to said first class and an average percentage of geographical areas belonging to said second class. By determining per footprint a percentage of geographical areas belonging to said first class and a percentage of geographical areas belonging to said second class and averaging these percentages, the Gaussian distribution of the sensor signal may be taken into account, resulting in a geographical area present in a smaller footprint having a higher weight than a geographical area present in a larger footprint.

The step of said a processor determining for each element of said sensor data set said brightness temperature for said first class and said brightness temperature for said second class may comprise a processor determining an average brightness temperature for said second class from a plurality of percentages, said plurality of percentages comprising for each of a plurality of elements of said sensor data set a percentage of an element of said plurality of elements belonging to said first class and a percentage of said element belonging to said second class and may optionally further comprise a processor determining for each element of said sensor data set a brightness temperature for said first class based on a percentage of said each element belonging to said first class and a percentage of said each element belonging to said second class. In this way, a (relatively) accurate brightness temperature for the first class may be determined for each element of the sensor data set. Since the brightness temperatures of certain water classes, e.g. of a sea class, are very similar for most geographical areas, e.g. "pixels" of the map, a brightness temperature that varies within certain constraints/bounds, or even an average brightness temperature, may be used for those water classes. The (relatively) accurate brightness temperatures determined for the first class (which is a land class) for each element of the sensor data set allows the brightness temperatures for each specific geographical area of the map to be determined (relatively) accurately as well.

A system for improving the resolution of sensor data comprises at least one receiver configured to receive a sensor data set and a map, each element of said sensor data set comprising a sensor footprint identifier allowing a sensor footprint to be identified and a brightness temperature measured for said sensor footprint and said map defining for each of a plurality of geographical areas whether it belongs to one of said first class and said second class, said first class representing a land type, said second class representing a water type and said geographical area being smaller than said sensor footprint, and at least one processor configured to determine for said each element of said sensor data set received using said at least one receiver a brightness temperature for each of at least two classes including said first class and said second class based on said map received using said at least one receiver and to determine a brightness temperature for a specific geographical area of said map based on brightness temperatures associated with a plurality of footprints if said specific geographical area belongs to said first class, each of said plurality of footprints covering said specific geographical area, and based on a brightness temperature determined for said second class if said specific geographical area belongs to said second class.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: determining for each element of a sensor data set a brightness temperature for a first class of at least two classes and a brightness temperature for a second class of said at least two classes based on a map, said each element of said sensor data set comprising a sensor footprint identifier allowing a sensor footprint to be identified and a brightness temperature measured for said sensor footprint and said map defining for each of a plurality of geographical areas whether it belongs to one of said first class and said second class, said first class representing a land type, said second class representing a water type and said geographical area being smaller than said sensor footprint, and determining a brightness temperature for a specific geographical area of said map based on brightness temperatures associated with a plurality of footprints if said specific geographical area belongs to said first class, each of said plurality of footprints covering said specific geographical area, and based on a brightness temperature determined for said second class if said specific geographical area belongs to said second class.

In a further aspect of the invention, a method of improving the resolution of sensor data comprises the step of at least one processor determining at least one derived footprint for each element of a sensor data set, said each element of said sensor data set comprising a sensor footprint identifier allowing a sensor footprint to be identified and a brightness temperature measured for said sensor footprint, said sensor footprint contributing a first amount to said brightness temperature determined for said sensor footprint, each of said at least one derived footprint contributing a different amount to said brightness temperature determined for said sensor footprint. Said method may be performed by software running on a programmable device/system. This software may be provided as a computer program product.

As will be appreciated by one skilled in the art, aspects of the present invention may be embodied as a system, a device, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g. stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

In this detailed description, the term "ellipse" is used to indicate a shape. The term "footprint" has a well-known meaning in relation to satellites and has this same meaning in this detailed description. A footprint is generally ellipse-shaped and comprises the ground area encompassed by an ellipse. Thus, an ellipse is not the same as a footprint. The terms "sensor footprint" and "observed footprint" have the same meaning. They both refer to the original satellite footprint. This patent application introduces the concept of deriving additional ellipses from the ellipse encompassing a sensor footprint. The term "derived ellipse" refers to such an additional ellipse and the term "derived footprint" refers to the footprint encompassed by such an additional ellipse. When a "footprint" in general is referred to in a process step, e.g. without being preceded by "derived" or "sensor", this means that the process step applies to both sensor footprints and derived footprints, unless explicitly stated otherwise. When an "ellipse" in general is referred to in a process step, e.g. without being preceded by "derived" or "sensor", this means that the process step applies to both derived ellipses and ellipses encompassing a sensor footprint, unless explicitly stated otherwise.

Figure 1:
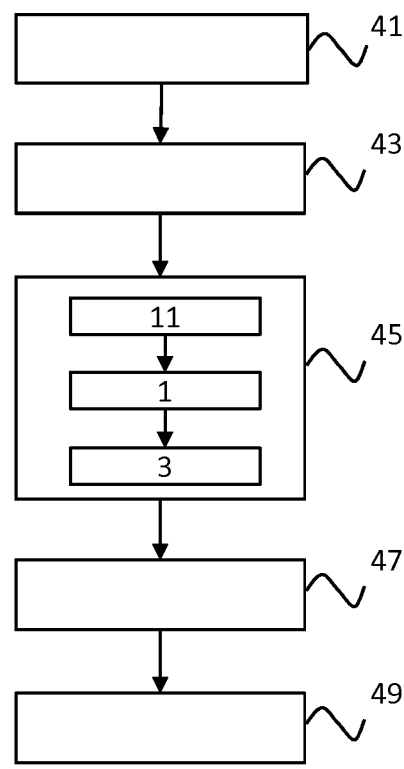
FIG. 1 is a flow diagram of an embodiment of a method of an aspect of the invention.

The method of improving the spatial resolution of sensor data comprises at least two steps and preferably further steps, see FIG. 1. A step 1 comprises a processor determining for each element of a (e.g. satellite) sensor data set a brightness temperature for a first class of at least two classes and a brightness temperature for a second class of the at least two classes based on a map, the each element of the (e.g. satellite) sensor data set comprising a sensor footprint identifier allowing a sensor footprint to be identified and a brightness temperature measured for the sensor footprint and the map defining for each of a plurality of geographical areas, e.g. "pixels", whether it belongs to one of the first class and the second class, the first class representing a land type, the second class representing a water type and the geographical area being smaller than the sensor footprint. A step 3 comprises a processor determining a brightness temperature for a geographical area of the map based on brightness temperatures associated with a plurality of footprints if the geographical area belongs to the first class, each of the plurality of footprints covering the geographical area, and based on a brightness temperature determined for the second class if the geographical area belongs to the second class. The sensor footprint is ellipse-shaped, for example.

FIG. 1 shows an embodiment of the method of improving the spatial resolution of sensor data, in particular a method of downscaling passive microwave brightness temperatures. This embodiment comprises a step 41 of downloading satellite data comprising brightness temperatures for multiple footprints, a step 43 of selecting data from the downloaded satellite data and excluding contaminated values (e.g. values that may have been or seem to have been affected by radar and/or communication signals), a step 45 of disaggregating footprints to derive brightness temperatures at 100 m×100 m resolution, a step 47 of storing the downscaled (i.e. higher resolution) data in a database and a step 49 of applying one or more methods and/or applications on downscaled data (e.g. soil moisture, vegetation biomass, land surface temperature, ice/snow thickness). Steps 1 and 3 are part of step 45 and are, in this embodiment, preceded by a step 11 comprising the relocation of observation points.

Figure 2:
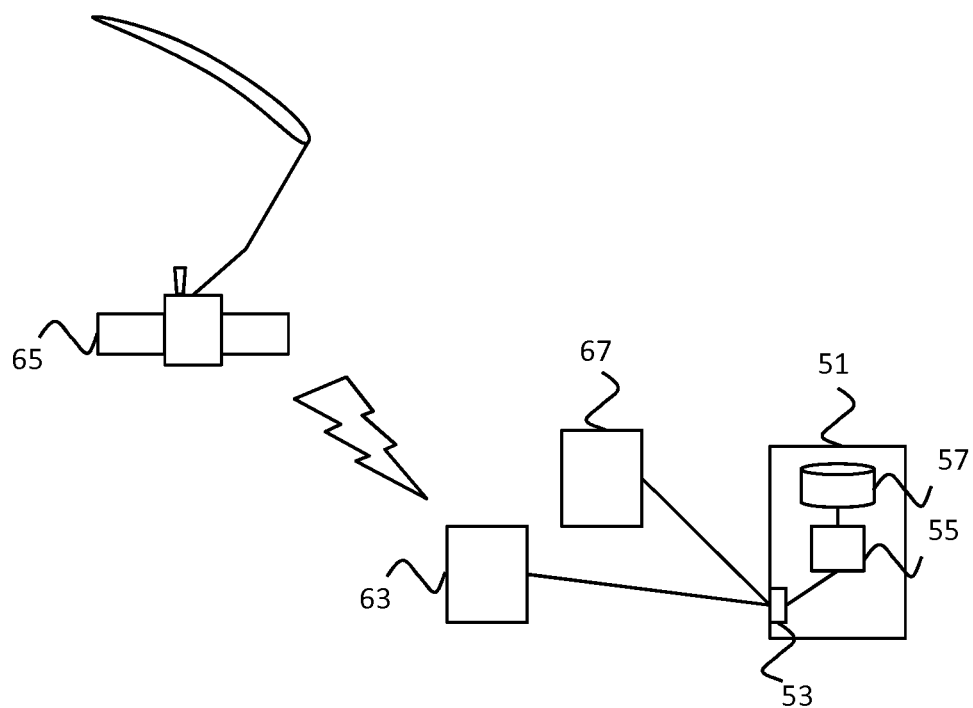
FIG. 2 is a block diagram of an embodiment of a system of an aspect of the invention
Figure 13:
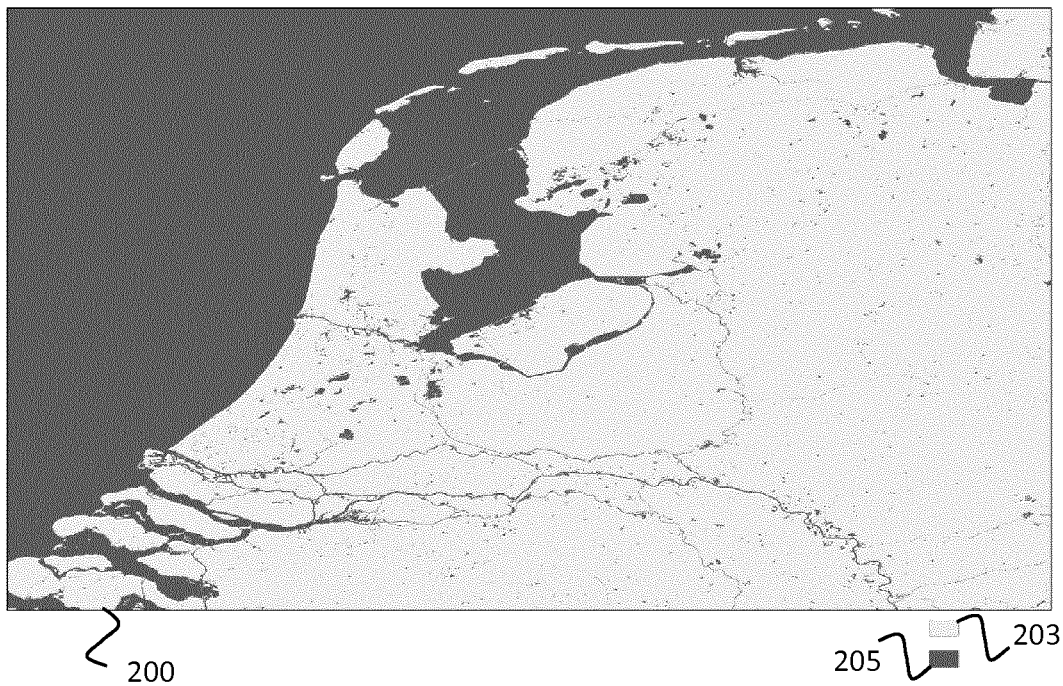
FIG. 13 shows an example of a map used in an embodiment of the method of the invention.

FIG. 2 shows an embodiment of a system for improving the spatial resolution of sensor data. System 51 depicted in FIG. 2 is configured to perform the steps of FIG. 1. System 51 comprises at least one receiver 53 and at least one processor 55. The at least one receiver 53 is configured to receive a (e.g. satellite) sensor data set and a map, each element of the (e.g. satellite) sensor data set comprising a sensor footprint identifier allowing a sensor footprint to be identified and a brightness temperature measured for the sensor footprint and the map defining for each of a plurality of geographical areas, e.g. "pixels", whether it belongs to one of a first class and a second class, the first class representing a land type, the second class representing a water type and the geographical area being smaller than the sensor footprint. An example of such a map is shown in FIG. 13. Map 200 is a map of the Netherlands (also including a part of Germany) which comprises pixels belonging either to a land class 203 or to a water class 205.

In the embodiment shown in FIG. 2, the satellite sensor data set is received by the at least one receiver 53 from a server 63 which receives raw sensor data from a satellite 65, processes it into the satellite sensor data and stores it on a storage facility. In the embodiment shown in FIG. 2, the map is received by the at least one receiver 53 from a server 67. The at least one receiver 53 may be connected to the Internet via a wire and/or wireless, for example. The at least one receiver 53 may comprise an Ethernet receiver and/or a WiFi (IEEE 802.11) receiver, for example. Different receivers may be used to receive data from server 63 and server 67.

The at least one processor 55 is configured to determine for the each element of the (e.g. satellite) sensor data set received using the at least one receiver 53 a brightness temperature for each of at least two classes including a first class and a second class based on a map received using the at least one receiver 53 and to determine a brightness temperature for a geographical area of the map based on brightness temperatures associated with a plurality of footprints if the geographical area belongs to the first class, the plurality of footprints covering the geographical area, and based on a brightness temperature determined for the second class if the geographical area belongs to the second class. The brightness temperatures for the geographical areas of the map, i.e. the downscaled/higher resolution brightness temperature data, may be stored in a storage means 57, for example. The storage means 57 may comprise one or more solid state memories and/or one or more hard disks, for example. The at least one processor 53 may comprise one or more Intel processors and/or one or more AMD processors, for example. The system 51 may run on a Windows or Unix-based, e.g. Linux, operating system, for example. The system 51 may comprise multiple devices, e.g. computers.

Figure 3:
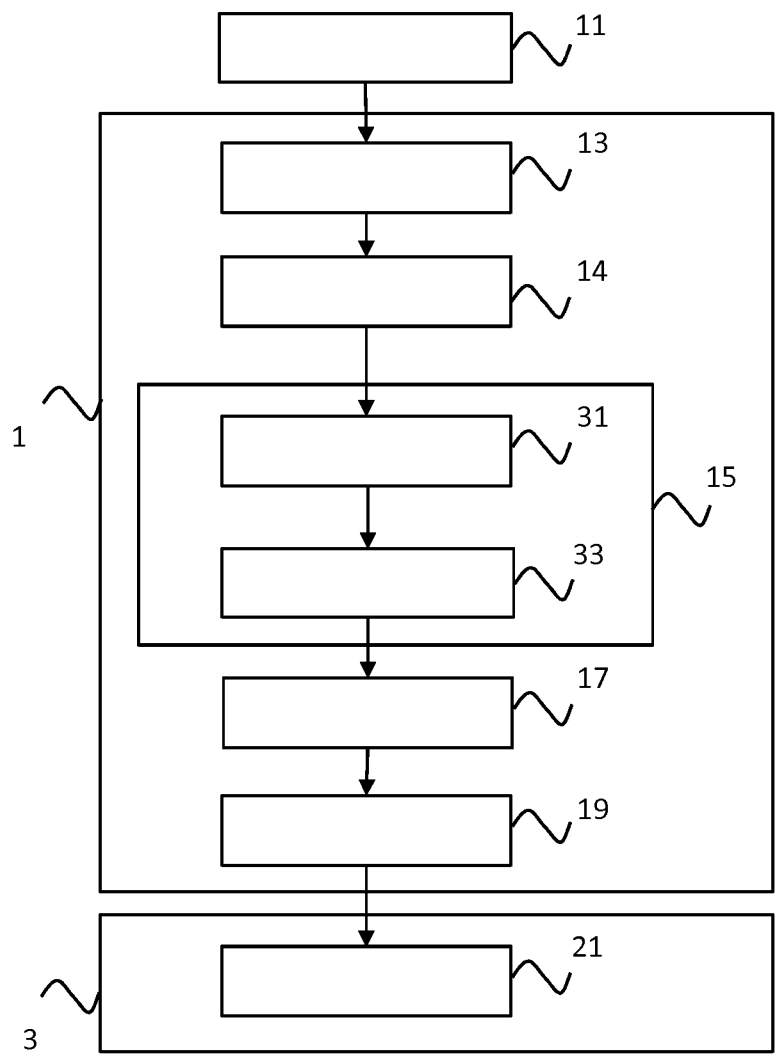
FIG. 3 is a flow diagram of embodiments of certain steps of FIG. 1.

An embodiment of step 45 of FIG. 1 is shown in FIG. 3. In step 11, the satellite sensor data set selected in step 41 is processed by a processor so as to relocate some of the observation points specified in the resampled data of AMSR2 L1R and higher data levels. The observation points are positions on the earth surface. This step is advantageous for certain multi-frequency sensors like AMSR2 in order to provide the right latitudes and longitudes of the observations. Multi-frequency sensors can perform observations/measurements on multiple frequencies simultaneously, but the footprints of the different frequencies are different, even though the position of the sensor is the same. Since the footprints are different for different frequencies, different frequencies are represented by different elements of the sensor data set. Step 11 can be skipped for certain single-frequency sensors, e.g. SMAP, and is not explained in detail in this description.

AMSR2 L1R and higher data levels contain resampled data in which the center latitude and longitude of 89 GHz observations are used. However, the actual center latitude and longitude differ per frequency channel. Therefore, 'raw' L1B AMSR2 data is used in step 45 rather than resampled data in order to be able to use the correct locations of the observation points. The metadata of L1B AMSR2 observations contain CoRegistrationParameterA1 and A2 for each frequency. These values are constant through time and space and are needed to calculate the correct center latitudes and longitudes. A series of formulas is needed to perform the calculation. These are described in the 'AMSR2 Level 1 Product Format Specification', document SGC-120003 relating to the Global Change Observation Mission—Water "SHIZUKU" (GCOM-W1) satellite, herein incorporated by reference.

Figure 4:
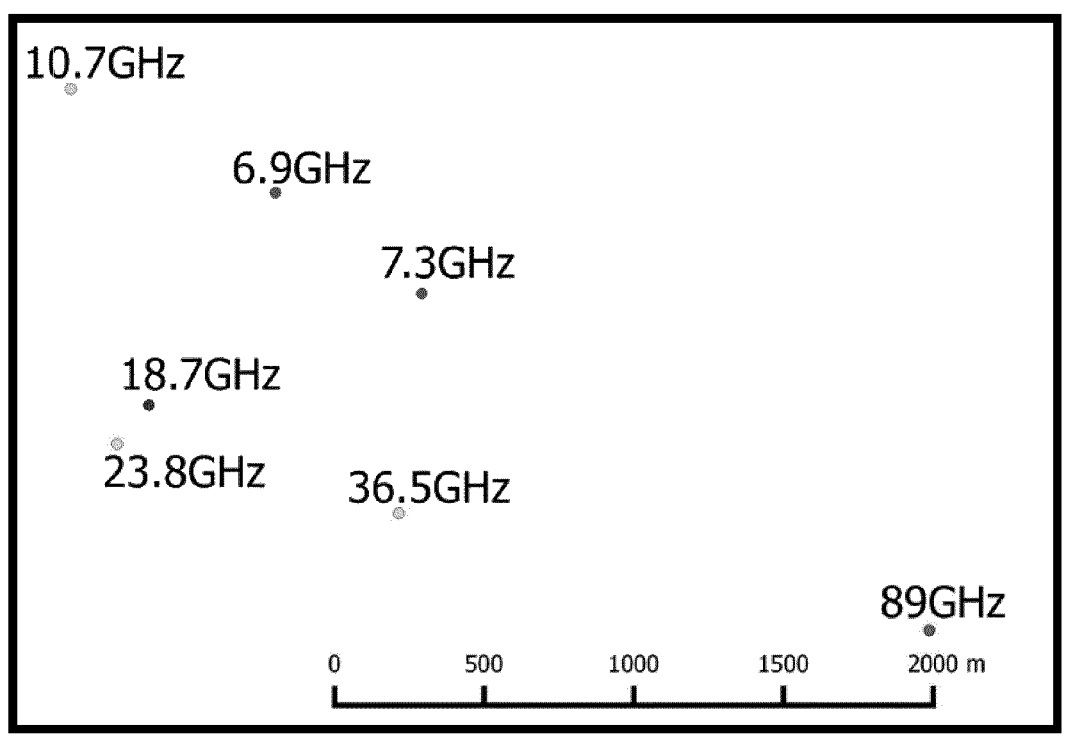
FIG. 4 depicts the differences between footprint centers for multiple frequencies of the same observation point.

In FIG. 4, the differences are shown between the actual footprint centers (X, Y coordinates) for the AMSR2 frequencies of the same observation point. The absolute distances between the centers are not fixed, but are dependent on the location in the observation swath.

Multiple ellipses are determined from the sensor footprints selected in step 41 and processed in step 11 in step 13 and associated with the corresponding sensor footprint in step 14. The ellipses encompassing the sensor footprints themselves may be included in these multiple ellipses. The other ellipses are referred to as "derived ellipses". The derived ellipses may comprise one or more ellipses smaller than the ellipse encompassing the sensor footprint and/or one or more ellipses larger than the ellipse encompassing the sensor footprint. Steps 13 and 14 are part of step 1. The brightness temperature measured for each sensor footprint has been determined from a signal received by the (e.g. satellite) sensor.

Figure 5:
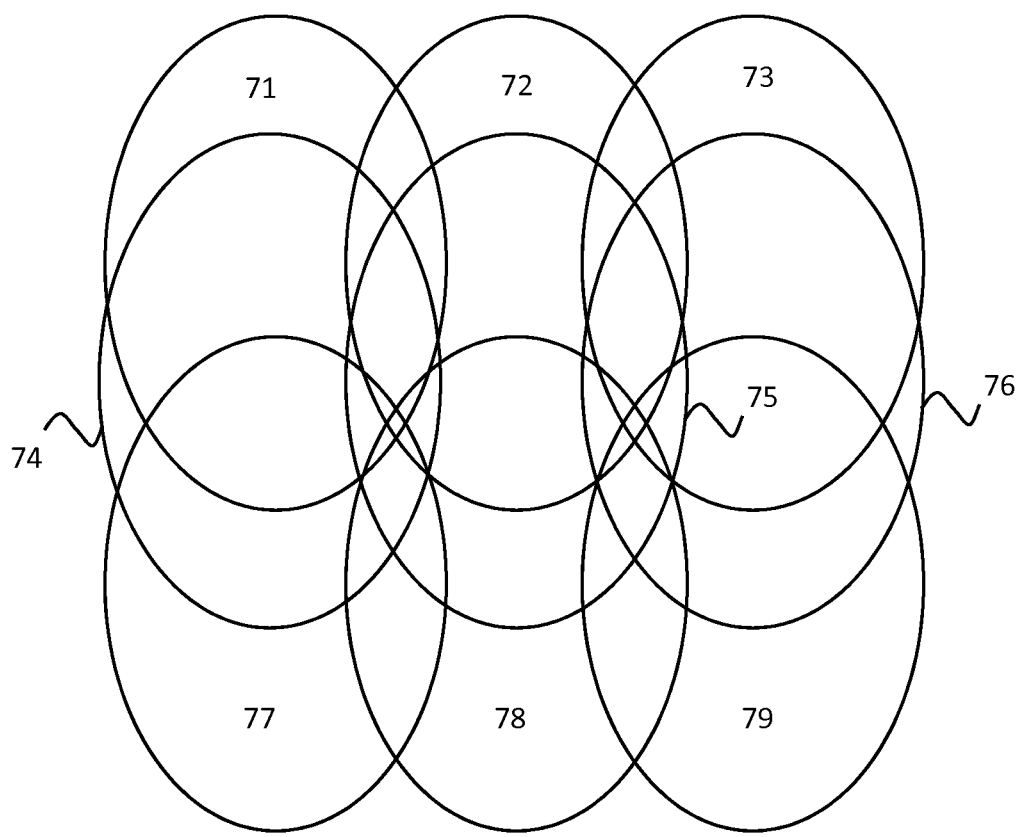
FIG. 5 depicts multiple sensor footprints obtained with a sensor.

FIG. 5 shows nine ellipses 71-79 encompassing nine satellite footprints. Each of the satellite footprints covers a different geographical space. The satellite footprints preferably overlap, as shown in FIG. 5. The satellite footprints together cover the area of interest, e.g. the area for which soil moisture data needs to be obtained. Satellite footprints are normally ellipse-shaped. Most passive microwave sensors have a Gaussian distribution within their footprints. This means that the center of the footprint contributes more to the observed brightness temperature values than the edges. The documented footprint sizes of the AMSR2 frequencies are the sizes when the intensity of the signal is decreased by 3 dB (~half). These footprints with 50% signal intensity, as documented for the AMSR2 frequencies, are referred to as sensor footprints in the remainder of this description. With this information, several ellipses with a certain contribution to the observed value can be created/derived from the sensor footprint. The following sub steps show the corrections and calculations that are needed to 'draw' the footprints on the right place on the Earth Surface.

Spatial resolution of the AMSR2 frequencies is shown in Table 1:

TABLE 1

| Band [GHz] | Polarization | Spatial Resolution (3-dB footprint size) [km × km] |
| --- | --- | --- |
| 6.93 | V, H | 62 × 35 |
| 7.3 | V, H | 62 × 35 |
| 10.65 | V, H | 42 × 24 |
| 18.7 | V, H | 22 × 14 |
| 23.8 | V | 19 × 11 |
| 36.5 | V, H | 12 × 7 |
| 89.0 | V, H | 5 × 3 |

From Table 1 and Equation 1, the value for the standard deviation of the observed antenna intensity ($\sigma$) for the width and the height of each ellipse can be obtained. The width and height of the −3 dB (50% intensity) AMSR2 footprints are shown for each frequency in Table 1. The relationship between the standard deviation ($\sigma$) and the full width at half maximum (FWHM, 50% intensity) of a Gaussian function is as in Equation 1:

$$\text{FWHM} = 2 * \sqrt{-2 * \ln(0.5)} * \sigma = 2.3556\sigma \qquad \text{(Equation 1)}$$

Figure 6:
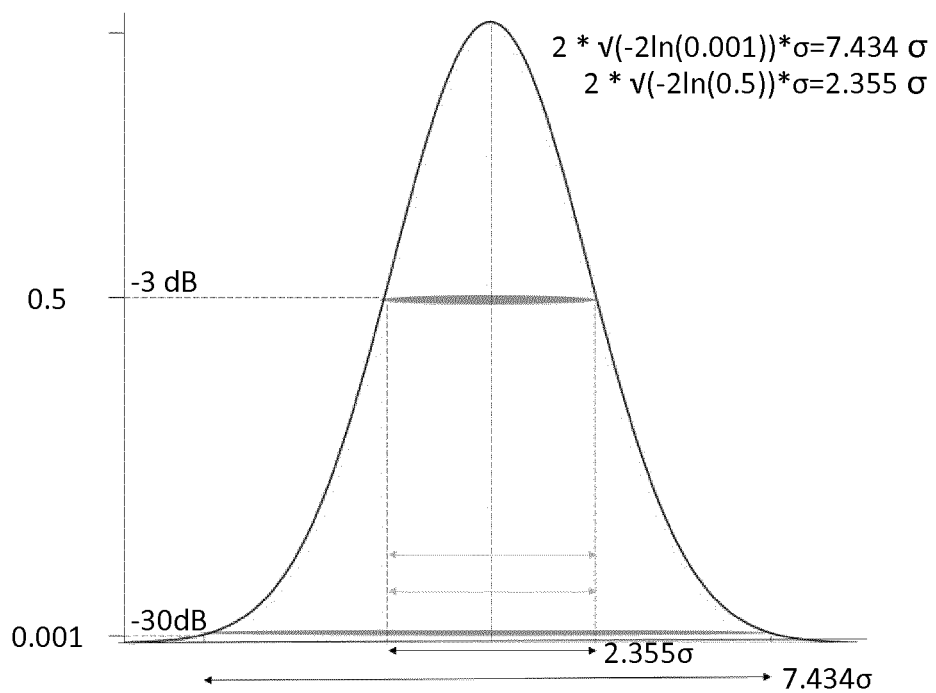
FIG. 6 depicts a Gaussian distribution.

In FIG. 6, the relation between the Gaussian distribution, the intensity and the curve width is illustrated. When the intensity is at half maximum (50%, −3 dB), the width of the curve is 2.355$\sigma$. The surface area of the curve above the −30 dB line contributes to approximately 100% of the brightness temperature value. The contribution of an ellipse is equal to 1 minus the intensity of the ellipse (compared to the maximum intensity). For example, if the intensity of the ellipse encompassing the sensor footprint is −3 dB, i.e. 0.5, then the corresponding contribution of the ellipse encompassing the sensor footprint is 1−0.5=0.5, i.e. 50% when represented as a percentage.

The full width at half maximum is known for each of the AMSR2 frequencies, see Table 1, and is different for the width of the footprint than for the height of the footprint. With this information, the standard deviation of the observed antenna intensity ($\sigma$) can be calculated for each frequency and for both the width and height of the footprint. These calculated standard deviations can be used to calculate the width and height of the ellipses obtained from the AMSR2 footprints.

For example, in case of 6.9 GHz:

$$\text{Width} = 35 \text{ km}; \sigma_w = \frac{35}{2.355} = 14.862$$

$$\text{Height} = 62 \text{ km}; \sigma_h = \frac{62}{2.355} = 26.327$$

Ellipses with the same center as the sensor footprint can be created from the sensor footprint in several manners. For example:

1. Ellipses with a different contribution to the observed temperature value can be created from the sensor footprint. In the described embodiment, a difference in contribution between two neighboring ellipses to a brightness temperature measured for the sensor footprint is the same for each two neighboring ones of the plurality ellipses. In an alternative embodiment, a difference in contribution between two neighboring ellipses to a brightness temperature measured for the sensor footprint is different for at least two neighboring ones of the plurality ellipses.

2. Ellipses with a different radius (but the same center) can be created from the sensor footprint.

The following equations show how the size for contribution x is calculated for each of the ellipses:

$$\text{Width}_x = 2*z*\sigma_w \quad \text{(Equation 2)}$$

$$\text{Height}_x = 2*z*\sigma_h \quad \text{(Equation 3)}$$

Z can be obtained for a certain contribution by using part of Equation 1, i.e. by calculating the square root of the multiplication of −2 and the natural logarithm (ln) of the ellipse intensity of contribution x.

For example, in case the contribution is 99.9%:

$$Z_{99.9} = \sqrt{-2*\ln(0.001)} = 3.717$$

And in case of 10% the contribution is 10%:

$$Z_{10} = \sqrt{-2*\ln(0.9)} = 0.459$$

For example, in case of the most outermost (~100% contribution) ellipse of 6.9 GHz:

$$\text{Width}_{100} = 2*3.717*14.862 = 110.214 \text{ km}$$

$$\text{Height}_{100} = 2*3.717*26.327 = 195.711 \text{ km}$$

Thus, the width of the curve corresponding to a 100% contribution is calculated by Equation 2, wherein the ellipse intensity is set to 0.001 and therefore has a value of $7.434\sigma$.

In this embodiment, step 13 comprises determining a plurality of derived footprints from the multiple ellipses. Each of the plurality of derived footprints contributes a different amount to the brightness temperature measured for the sensor footprint.

Figure 7:
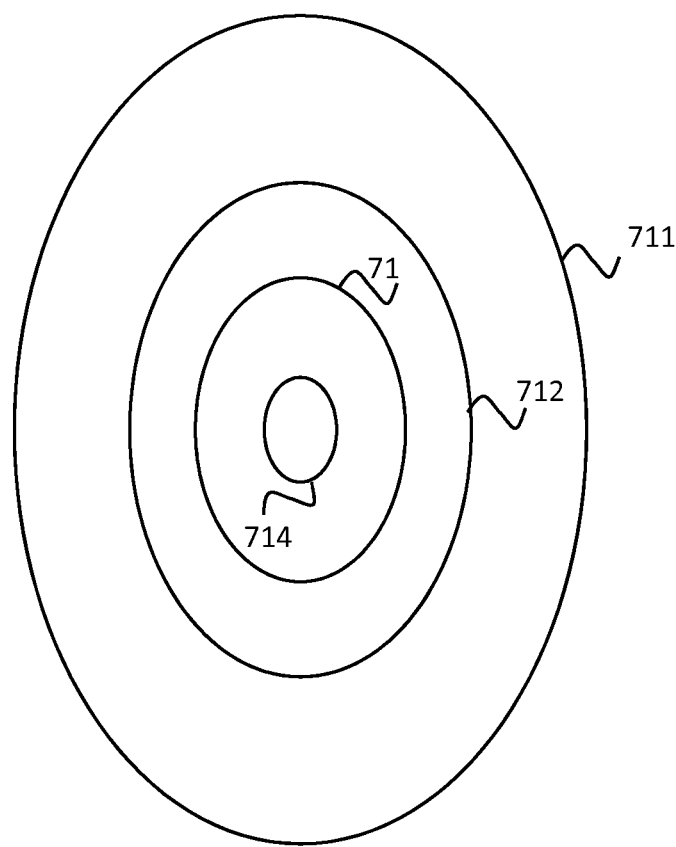
FIG. 7 depicts a sensor footprint and derived footprints obtained from this sensor footprint.

FIG. 7 shows the derived ellipses 711, 712 and 714 obtained from the sensor footprint encompassed by ellipse 71 of FIG. 5. Ellipse 711 encompasses a derived footprint representing a contribution of approximately 100%, ellipse 712 encompasses a derived footprint representing a contribution of 75% and ellipse 714 encompasses a derived footprint representing a contribution of 25%. In the embodiment of FIG. 7, a difference in contribution between two neighboring ellipses to a brightness temperature measured for the sensor footprint is the same for each two neighboring ones of the plurality of the ellipses 711-714, i.e. 25%. The derived footprints 711, 712 and 714 have substantially the same center as the sensor footprint 71.

Figure 8:
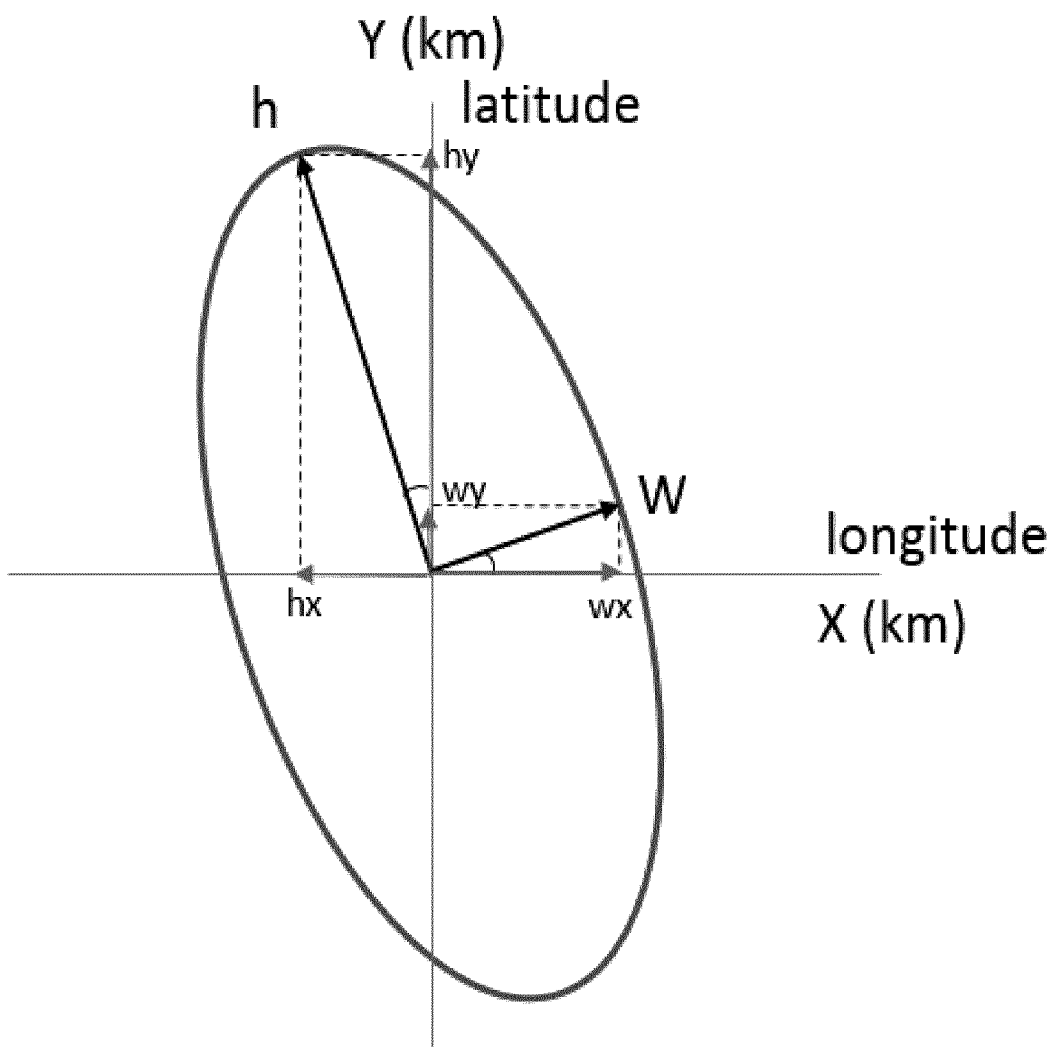
FIG. 8 illustrates the conversion from a size in kilometers to a size in latitude and longitude.

Until now, the sizes of the footprints have been given in kilometers. These are preferably converted to degrees latitude and longitude to align the ellipses to the map more accurately, see FIG. 8. This can be done with the following, known equations:

$$1° \text{ of latitude} = 111.133 - 0.559 \cos(2 \times \text{latitude}) \quad \text{(Equation 4)}$$

$$1° \text{ of longitude} = 111.413 \cos(\text{latitude}) - 0.094 \cos(3 \times \text{latitude}) \quad \text{(Equation 5)}$$

For each observation point, it is necessary to know to what extent the footprint must be tilted to project it right on the Earth's surface. It depends on the satellite which information is needed to obtain the right angle.

The footprints are then numbered and saved.

In step 15 of FIG. 3, a processor determines for each element of the sensor data set which geographical areas of the map both belong to the first class and are covered by at least one footprint associated with said element and which geographical areas of the map both belong to the second class and are covered by at least one footprint associated with said element. A geographical area present in a smaller footprint has a higher weight than a geographical area present in a larger footprint in determining a percentage of the at least one footprint belonging to the first class and a percentage of the at least one footprint belonging to the second class. This is explained in more detail in the next paragraphs.

A high-resolution land/water map of the area of interest may be made by combining information from for example the ESA Sentinel satellites and static land cover maps (e.g. Corine, CCI). An example of such a map is shown in FIG. 13. Depending on the complexity of the area of interest, it may be beneficial to include extra land use classes (e.g. distinction between salt/fresh water; tidal areas), but in the current embodiment, only one land class is used. This map will typically be updated frequently. This high-resolution map is overlaid over the ellipses. For each footprint, the occurrences of the land classes are calculated whereby the Gaussian distribution is considered.

In the embodiment shown in FIG. 3, step 15 comprises two sub steps. A sub step 31 comprises determining for each element of the sensor data set, for each of the at least one footprint, a percentage of geographical areas belonging to the first class which are covered by the footprint and a percentage of geographical areas belonging to the second class which are covered by the footprint. A sub step 33 comprises determining for each element of the sensor data set an average percentage of geographical areas of the map belonging to the first class and an average percentage of covered geographical areas of the map belonging to the second class from the percentages determined for each of a plurality of footprints. Examples are provided in the next paragraphs.

The geographical areas covered by a footprint can be determined in at least one of the two following manners:

a. All geographical areas that are in the footprint are counted, even the ones that are also in smaller footprints encompassed by the footprint.

b. Only the geographical areas that are not in smaller footprints encompassed by the footprint are counted.

Figure 9:
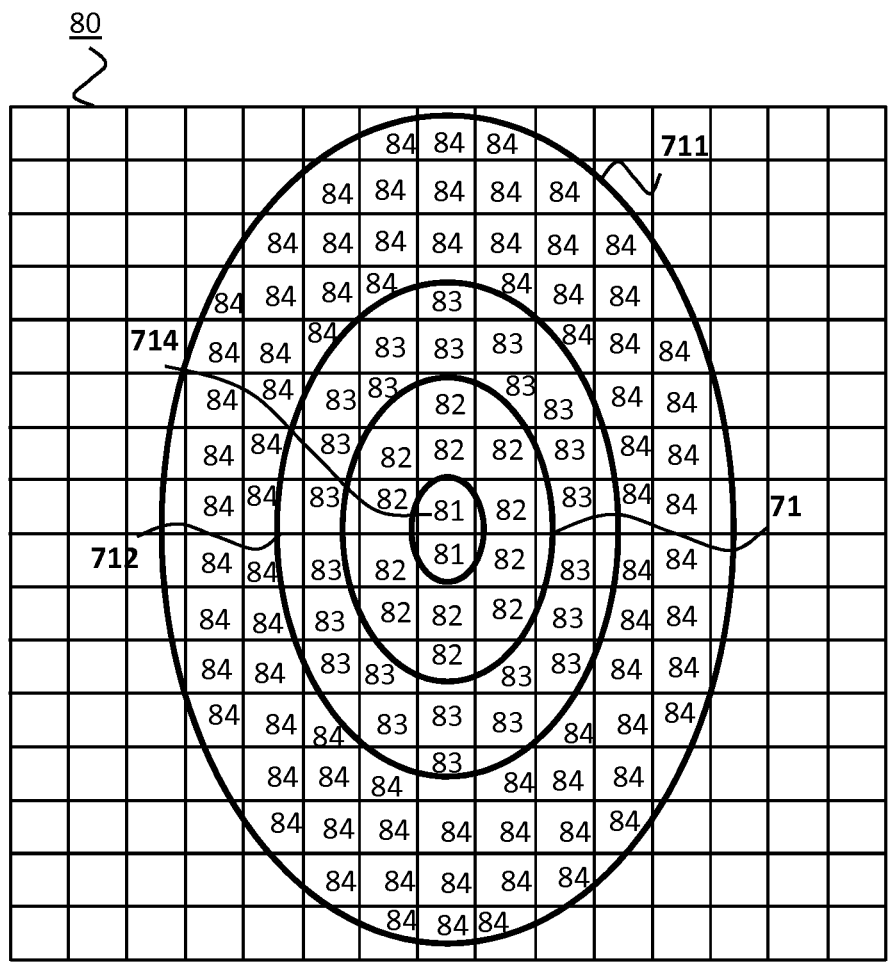
FIG. 9 depicts the footprints of FIG. 7 overlaid on a map.

Step 31 is described with the help of FIG. 9. FIG. 9 shows the ellipses 71, 711, 712 and 714 of FIG. 7 overlaid on a land cover map 80 (whose values are not shown). The geographical areas a counted in manner a) in the following example. The derived footprint encompassed by ellipse 714 covers map pixels 81 (2 in total). The sensor footprint encompassed by ellipse 71 covers map pixels 81 and 82 (2+12=14 in total). The derived footprint encompassed by ellipse 712 covers map pixels 81, 82 and 83 (2+12+24=38 in total). The derived footprint encompassed by ellipse 711 covers map pixels 81, 82, 83 and 84 (2+12+24+79=116 in total). In this example, a footprint is considered to cover a map pixel when it overlays at least 50% percent of the map pixel. For a certain class, the percentage of map pixels covered by a certain footprint can be calculated by determining how many of these map pixels are of the certain class divided by the total amount of pixels covered by the certain footprint. For example, for the derived footprint encompassed by ellipse 71, assuming that there is 1 land pixel 81 and 1 water pixel 81, 8 land pixels 82 and 4 water pixels 82, the percentage land pixels is (1+8)/14=64% and the percentage water pixels is (1+4)/14=36%. If the geographical areas are counted in manner b), the pixel counts are as follows: ellipse 714=2 pixels, ellipse 71=12 pixels, ellipse 712=24 pixels and ellipse 711=79 pixels. If the geographical areas are counted in manner b), the percentage land pixels of ellipse 71 is (1+7)/12=67% and the percentage water pixels of ellipse 71 is (1+3)/12=33%.

In step 33, average percentages are calculated for each element of the sensor data set from the percentages calculated in step 31 for the footprints. For example, if the percentage land pixels is 50% for the derived footprint encompassed by ellipse 714, 64% for the sensor footprint encompassed by ellipse 71, 70% for the derived footprint encompassed by ellipse 712 and 80% for derived footprint encompassed by ellipse 711, then the average percentage land pixels for the satellite sensor data set element comprising sensor footprint 71 may be calculated as (50%+64%+70%+80%)/4=66%. As shown in this example, the footprints contribute equally to the summation ($\frac{1}{4}^{th}$ in this example) despite covering different amounts of map pixels. Since there are less map pixels in a smaller footprint, this results in map pixels of a smaller footprint having a higher weight than map pixels of a larger footprint that are not part of the smaller footprint.

Furthermore, since a larger footprint covers all map pixels of the smaller footprints that it contains when using manner a), map pixels of a smaller footprint are counted multiple times. In manner a), map pixels of a smaller footprint are not only counted when determining the percentage of land pixels covered by the smaller footprint, but also when determining the percentage of larger footprints that contain the smaller footprint. This also results in map pixels of a smaller footprint having a higher weight than map pixels of a larger footprint that are not part of the smaller footprint, even though the footprints themselves contribute equally to the summation. However, manner b) is considered preferable over manner a). After step 15, the derived footprints are not used again until step 21.

Step 15 is followed by a step 17, see FIG. 3. Step 17 comprises determining a brightness temperature for the second class (e.g. water class) from a plurality of percentages and from brightness temperatures associated with a plurality of elements. The plurality of percentages comprises for each of the plurality of elements of the (e.g. satellite) sensor data set a percentage of at least one footprint associated with the element belonging to the first class and the at least one footprint belonging to the second class. In this embodiment, these (average) percentages have been determined in step 33. An example of the output of step 33 is given in Table 2. The column labelled "Footprint#" refers to the sensor footprints, i.e. the elements of the sensor data set. The percentages are averaged over all (sensor and derived) footprints associated with the corresponding element, as described in relation to step 33. Since the footprint size is not dependent on the polarization, the percentage of land and the percentage of water are also not dependent on the polarization. In case a multi-frequency sensor is used, as the percentage of land and the percentage of water are dependent on the used frequency, separate tables (e.g. each resembling Table 2) may be used for each frequency or the information may be stored separately in the same table per frequency, for example. This is not the case in the described embodiment.

TABLE 2

Example output of step 33

| Footprint# | Land % | Water % |
|---|---|---|
| 1 | 100 | 0 |
| 2 | 90 | 10 |
| 3 | 95 | 5 |
| 4 | 80 | 20 |
| 5 | 60 | 40 |
| ... | ... | ... |

The observed/measured brightness temperature values of the sensor data, shown in Table 3, are used in combination with the output of step 33 to optimize brightness temperatures for each class. In case a sensor is used that operates at both polarizations (horizontal and vertical), as the observed brightness temperatures are dependent on the used polarization, separate tables (e.g. each resembling Table 3) may be used for each polarization or the information may be stored separately in the same table per polarization, for example. This is not the case in the described embodiment.

TABLE 3

Observed brightness temperatures (TB)

| Footprint# | TB (K) |
|---|---|
| 1 | 260 |
| 2 | 235 |
| 3 | 250 |
| 4 | 225 |
| 5 | 220 |
| ... | ... |

The average brightness temperatures per class are determined in this embodiment by using an optimization algorithm, in particular a minimization algorithm like the Sequential Least Squares Programming (SQLP) algorithm. A minimization algorithm is applied to a function which captures the known and unknown variables and the relations between them. An example is provided in the following Python script:

```
fn = lambda x: np.sqrt(np.mean(np.square(abs((x[0]*fp[:,2] + x[1]*fp[:,1])-self.tb[polarization]))))
self.opt[polarization] = sp_minimize(fn, x0=[100,200], method='SLSQP'.values( )[5]
fp = Table 2
fp[:,2] = water percentage as fraction
fp[:,1] = land percentage as fraction
self.tb[polarization] contains TBs of column 2 of Table 3 for a certain polarization
self.opt[polarization] = outcome of optimization
x0 = initial guess; value is not very important
.values( )[5] is used to get the optimized values for x[0] (water class) and x[1] (land class)
Explanation:
The module sp_minimize is used to give the water (x[0]) and land (x[1]) class the brightness temperature that corresponds to the lowest root mean square error:
```

$$RMSE = \sqrt{\frac{\sum_{k=1}^{n}(TBE_k - TBO_k)^2}{n}}$$

$TBE_k$ = Estimated brightness temperature (x[0]*fp[k,2]+x[1]*fp[k,1])
$TBO_k$ = Observed brightness temperature for footprint k
n = Number of footprints As explained in the above Python script, the brightness temperatures that correspond to the lowest root mean square error (RMSE) are determined. An equation expressing $TBE_k$ as a parameterized function of $TBO_k$ is not required when using a minimization algorithm. It is sufficient to have an equation which captures the known and unknown variables and the relations between them. The $TBO_k$ values of Table 3 and the land/water class percentages of Table 2 are known. The relation between the unknown $TBE_k$ values (x[0]*fp[k,2]+x[1]*fp[k,1]; x[0] and x[1] being unknown values) and the known land/water class percentages (fp[k,1] and fp[k,2]) is captured in the lambda function (see also the RMSE equation). The relation between the unknown $TBE_k$ values and the known $TBO_k$ values (self.tb[polarization]) is also captured in the lambda function (see also the RMSE equation). In the above example, the initial guess that is used in the minimization algorithm is 100K for the water class (x[0]) and 200K for the land class (x[1]), but this initial guess is not very important. The footprints referred to in the Python script (and in Tables 2 and 3) are sensor footprints. Using a larger number of footprints (n in the definition of RMSE) helps the optimization algorithm find optimal values.

Step 17 is followed by a step 19, see FIG. 3. In step 19, optimal brightness temperatures are determined (not to be confused with the optimization algorithm used in step 17) for the first class per element of the sensor data set (each element comprising a sensor footprint identifier). Step 19 comprises determining for each element of the sensor data set a brightness temperature for the first class (e.g. land class) based on the brightness temperature for the second class determined in step 17, a percentage of at least one footprint associated with the element belonging to the first class and a percentage of the at least one footprint belonging to the second class. In this embodiment, the percentage of each element belonging to the first class and the percentage of each element belonging to the second class were determined in step 33. The brightness temperature determined for the first class in step 17 is discarded.

The brightness temperature for the land class ($TB\_land_k$) can be determined per element of the sensor data set for each element of the data set k, with the following equation, for example:

$$TB\_land_k = \frac{(TB_k - \% \ water_k * TB\_water)}{\% \ land_k} \quad \text{(Equation 6)}$$

Where $\%\ land_k$ and $\%\ water_k$ are obtained from Table 2 and $TB_k$ is obtained from Table 3 for each footprint sensor k and where TB_water is the average brightness temperature for the water class determined in step 17. In an alternative embodiment, TB_water may vary within certain constraints/bounds. If multiple land classes are used, it may be necessary to use an optimization algorithm, e.g. a minimization algorithm. So spatial variation in brightness temperature on land is implemented by the optimization of brightness temperatures per sensor footprint whereby the water classes have fixed values (as previously described) or alternatively, values that vary within certain constraints/bounds (not described in detail in this patent application). For each sensor footprint, new land brightness temperatures are calculated to match the observed brightness temperature. Thus, while optimal water brightness temperatures were determined in step 17 (land brightness temperatures were also determined, but these are discarded), optimal land brightness temperatures are determined in step 19.

As part of step 3, step 21 is performed after step 19, see FIG. 3. In step 21, brightness temperature values are assigned to each pixel of the high-resolution map (in this embodiment, at least one footprint covers each pixel of the map). Step 21 comprises determining the brightness temperature for a geographical area ("pixel") of the map based on the brightness temperatures associated with a plurality of footprints (in this embodiment both the sensor footprints and the derived footprints) if the geographical area belongs to the first class by assigning a higher weight to a brightness temperature associated with a smaller footprint and a smaller weight to a brightness temperature associated with a larger footprint.

Figure 10:
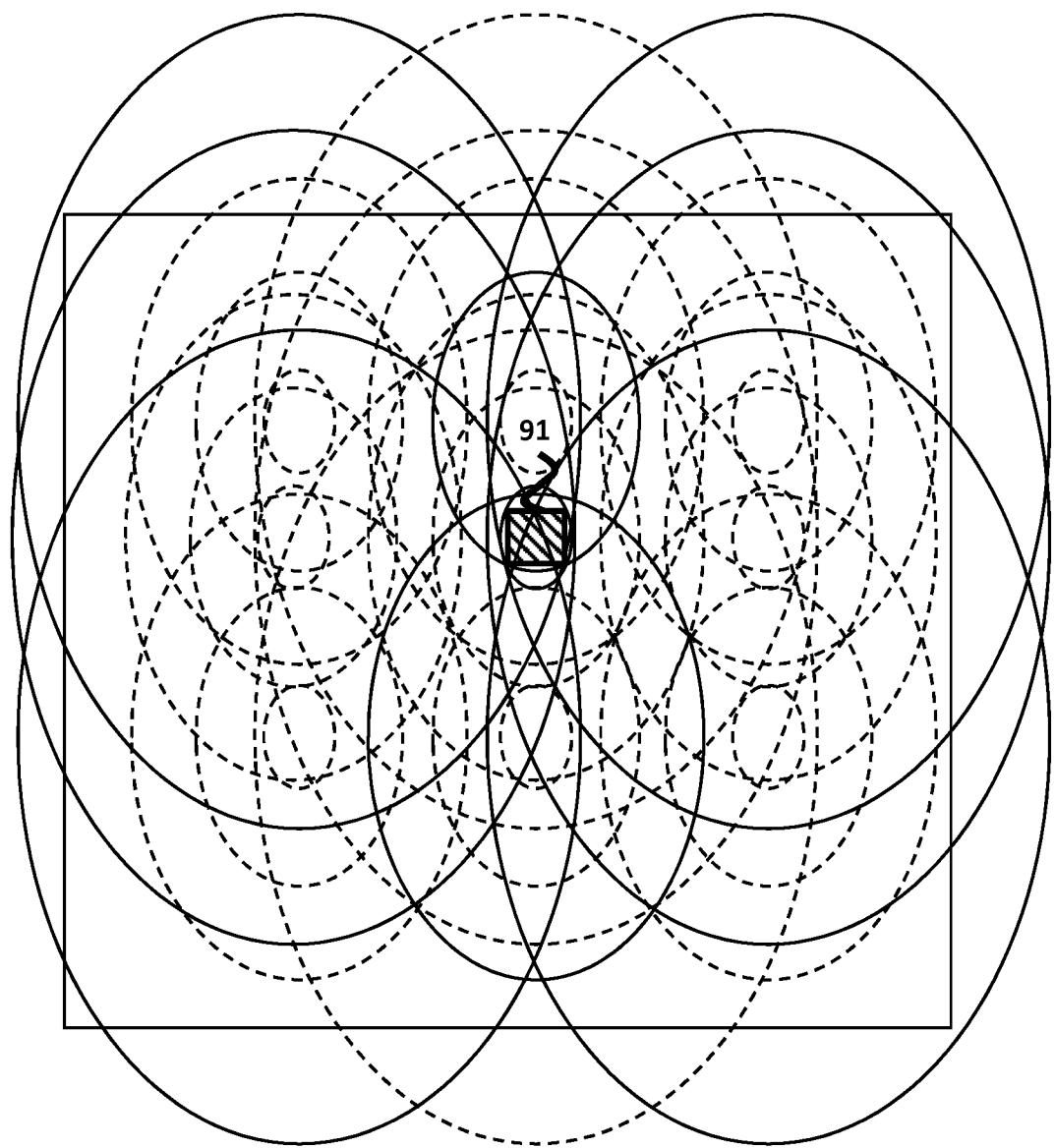
FIG. 10 depicts a geographical area of a map and the footprints covering this geographical area.
Figure 11:
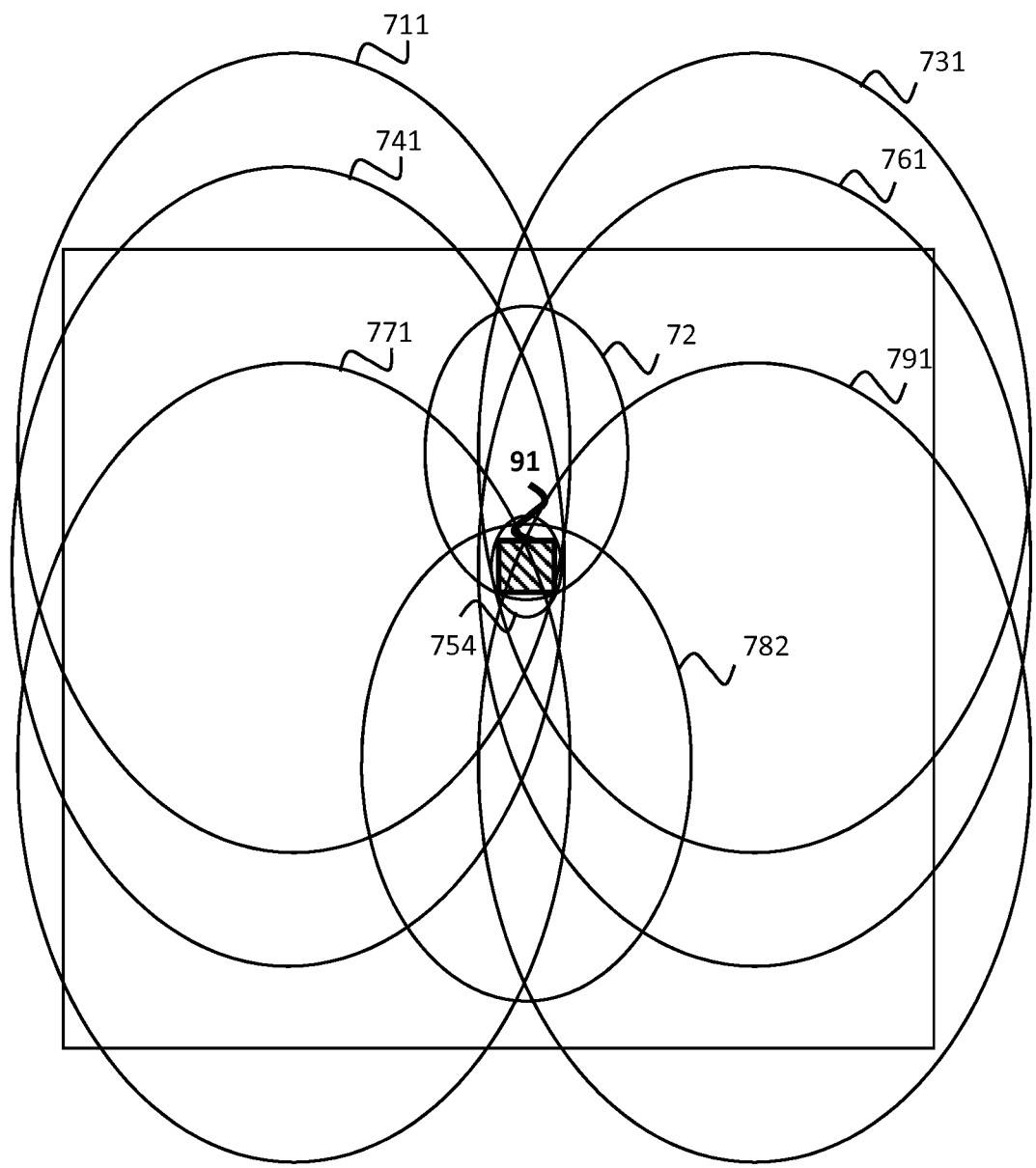
FIG. 11 depicts a geographical area of a map and a selection of the footprints covering this geographical area.

If the geographical area/"pixel" belongs to the second class, i.e. a water class, the average brightness temperature for the water class determined in step 17 is used as brightness temperature for the specific geographical area. If the geographical area/"pixel" belongs to the first class, i.e. a land class, the brightness temperature for the geographical area is calculated using the brightness temperatures for the first class that were determined for the overlapping footprints. An example is shown in FIGS. 10 and 11. FIG. 10 shows the nine sensor footprints of FIG. 5 and their derived footprints (25%, 75% and 100% derived footprints for each sensor footprint). In this embodiment of step 21, only one footprint per sensor footprint is used: the footprint with the highest intensity. The geographical area/"pixel" 91 is thus covered by nine footprints: 1× in the 25% derived footprint encompassed by ellipse 755, 1× in the 50% sensor footprint encompassed by ellipse 72, 1× in the 75% derived footprint encompassed by ellipse 782, and 6× in the 100% derived footprints encompassed by ellipses 711, 741, 771, 731, 761 and 791, as shown in FIG. 11.

The brightness temperature for the geographical area/"pixel" belonging to the first class is calculated using the brightness temperatures of each overlapping (sensor or derived) footprint, i.e. the brightness temperatures determined for the first class for each element of the sensor data set in step 19. The brightness temperature of a derived footprint obtained from a sensor footprint is equal to the brightness temperature determined for the sensor footprint, but footprints are weighted differently depending on their contribution to the brightness temperature. In this embodiment, footprints are weighted depending on their relative intensity, a smaller footprint having a higher weight than a larger footprint. In this embodiment, the weights correspond to the ellipse intensity compared to the maximum intensity. A contribution of 75% corresponds to an intensity of 0.25, a contribution of 100% corresponds to an intensity of approximately 0.01, a contribution of 25% corresponds to an intensity of 0.75 and a contribution of 50% corresponds to an intensity of 0.50.

Assume in the example of FIGS. 10 and 11, that the brightness temperatures as measured for the footprints are as follows (all footprints associated with the same element of the sensor data are considered to have the same temperature): footprint encompassed by derived ellipse 754: 215K (=temperature measured for sensor footprint 75), sensor footprint encompassed by ellipse 72: 225K, derived footprint encompassed by ellipse 782: 216K (=temperature measured for sensor footprint 78), footprint encompassed by derived ellipse 711: 220K (=temperature measured for sensor footprint 71), footprint encompassed by derived ellipse 741: 219K (=temperature measured for sensor footprint 74), footprint encompassed by derived ellipse 771: 220K (=temperature measured for sensor footprint 77), footprint encompassed by derived ellipse 731: 230K (=temperature measured for sensor footprint 73), footprint encompassed by derived ellipse 761: 221K, and footprint encompassed by derived ellipse 791: 230K (=temperature measured for sensor footprint 79). The brightness for the geographical area/ "pixel" 91 of the example of FIGS. 10 and 11 can be calculated as follows:

$$\frac{225*0.5+215*0.75+216*0.25}{1*0.75+1*0.5+1*0.25+6*0.01} + \frac{0.01*(220+230+219+221+220+230)}{1*0.75+1*0.5+1*0.25+6*0.01} = 218.7 \text{ K} \quad \text{(Equation 7)}$$

Figure 12:
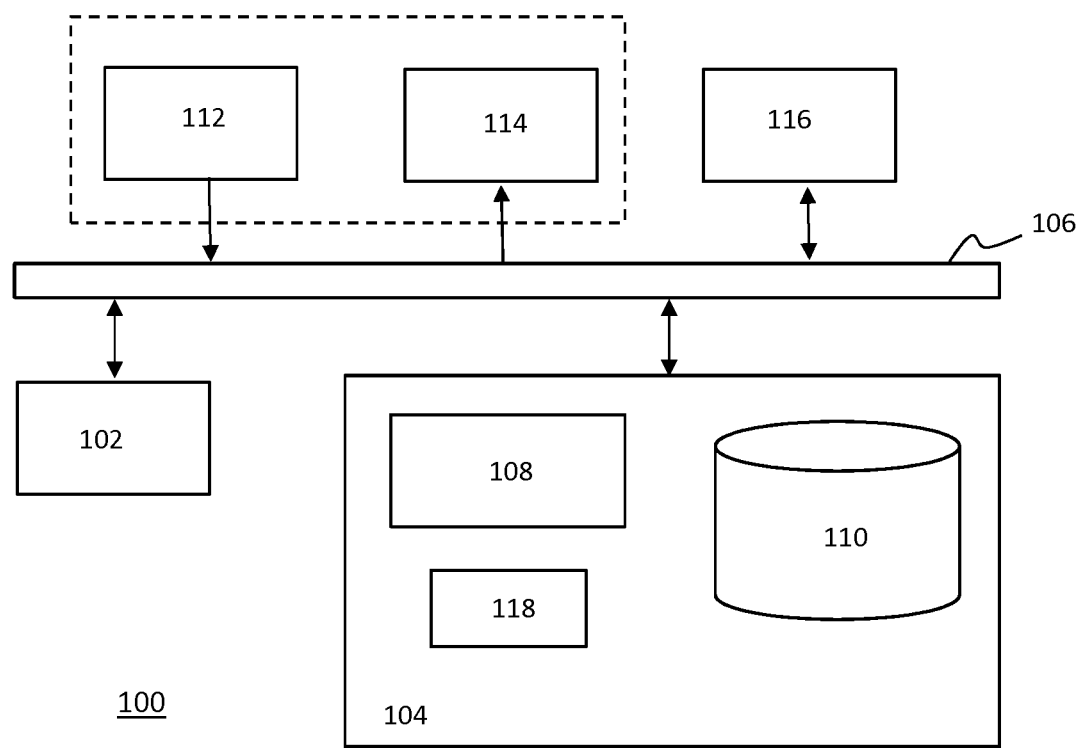
FIG. 12 is a block diagram of an exemplary data processing system for performing the method of the invention.

FIG. 12 depicts a block diagram illustrating an exemplary data processing system that may perform the methods as described with reference to FIGS. 1 and 3.

As shown in FIG. 12, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 12, the memory elements 104 may store an application 118. In various embodiments, the application 118 may be stored in the local memory 108, the one or more bulk storage devices 110, or separate from the local memory and the bulk storage devices. It should be appreciated that the data processing system 100 may further execute an operating system (not shown in FIG. 12) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

Figure 14:
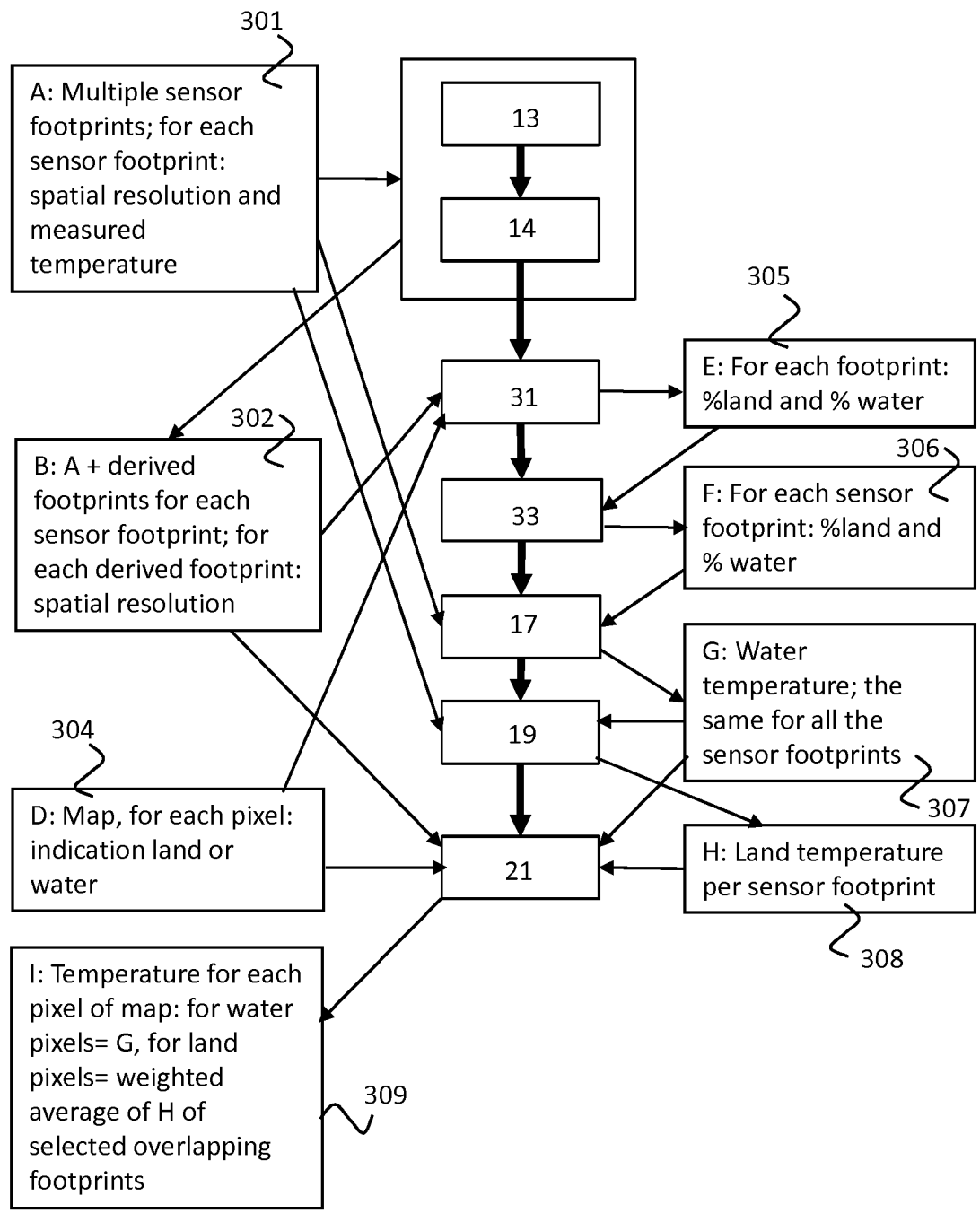
FIG. 14 shows the inputs used by and outputs generated by the various steps of FIG. 3 in the described embodiment.

FIG. 14 summarizes the inputs used by the steps depicted in FIG. 3 and the outputs generated by the steps depicted in FIG. 3, as described previously in this detailed description of the drawings. Steps 13 and 14 use data 301 (A) as input. Data 301 comprises/identifies multiple sensor footprints and for each sensor footprint a spatial resolution and a measured temperature. Steps 13 and 14 generate data 302 (B) as output. Data 302 comprises the data of data 301 plus derived footprints for each sensor footprint, including a spatial resolution for each derived footprint. Step 31 uses data 302 (B) and data 304 (D) as input and generates data 305 (E) as output. Data 304 comprises a map, which indicates for each pixel whether the pixel represents land or water. Data 305 comprises for each footprint (sensor footprints and derived footprints) the percentage of water in the footprint and the percentage of land in the footprint. Step 33 uses data 305 (E) as input and generates data 306 (F) as output. Data 306 comprises for each sensor footprint the percentage of water in the sensor footprint and the percentage of land in the sensor footprint. Data 305 also comprises for each sensor footprint a percentage of water in the sensor footprint and a percentage of land in the sensor footprint, but these provide worse results and are not used beyond step 33.

Step 17 uses data 301 (A) and data 306 (F) as input and generates data 307 (G) as output. Data 307 comprises a water temperature, which applies to all the sensor footprints. Step 19 uses data 301 (A) and data 307 (G) as input and generates data 308 (H) as output. Data 308 comprises a land temperature per sensor footprint. Step 21 uses data 302 (B), data 304 (D), data 307 (G) and data 308 (H) as input and generates data 309 (I) as output. Data 309 comprises a temperature for each pixel of the map (data 304). If a pixel represents water, the temperature of data 307 is used as the temperature of this pixel. If a pixel represents land, a weighted average of the temperatures of data 308 of selected overlapping footprints (for each sensor footprint, the smallest overlapping footprint is selected using data 302, which may be the sensor footprint itself or a derived footprint) are used as the temperature of this pixel. This constitutes the high-resolution sensor data. After step 21, data 309 can be processed to generate soil moisture data. In the described embodiment, only two classes are used: a water class and a land class.

Figure 15:
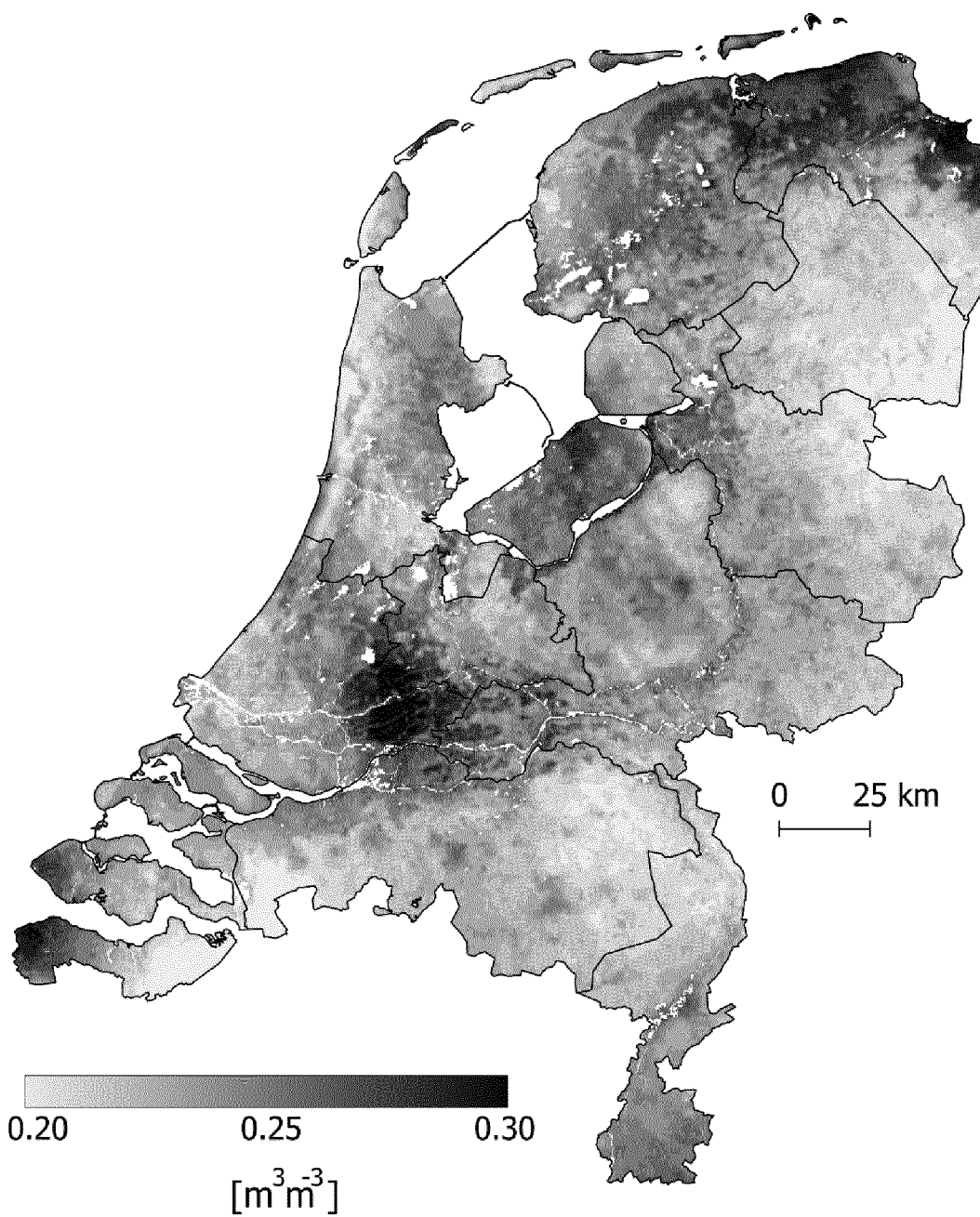
FIG. 15 depicts soil moisture data derived from sensor data with improved resolution determined in an embodiment of the method of the invention.
Figure 16:
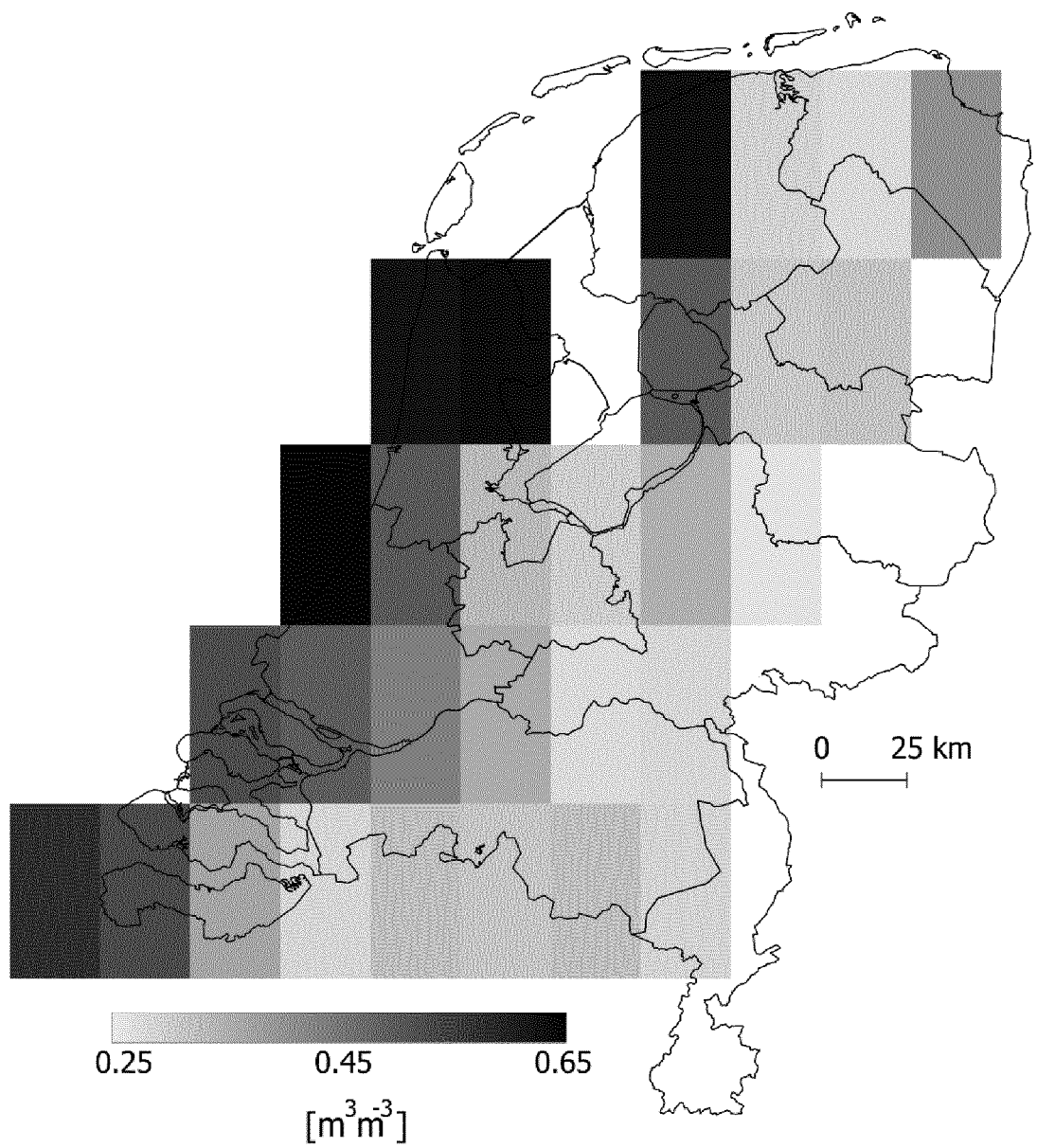
FIG. 16 depicts soil moisture data determined with a prior art method.
Figure 17:
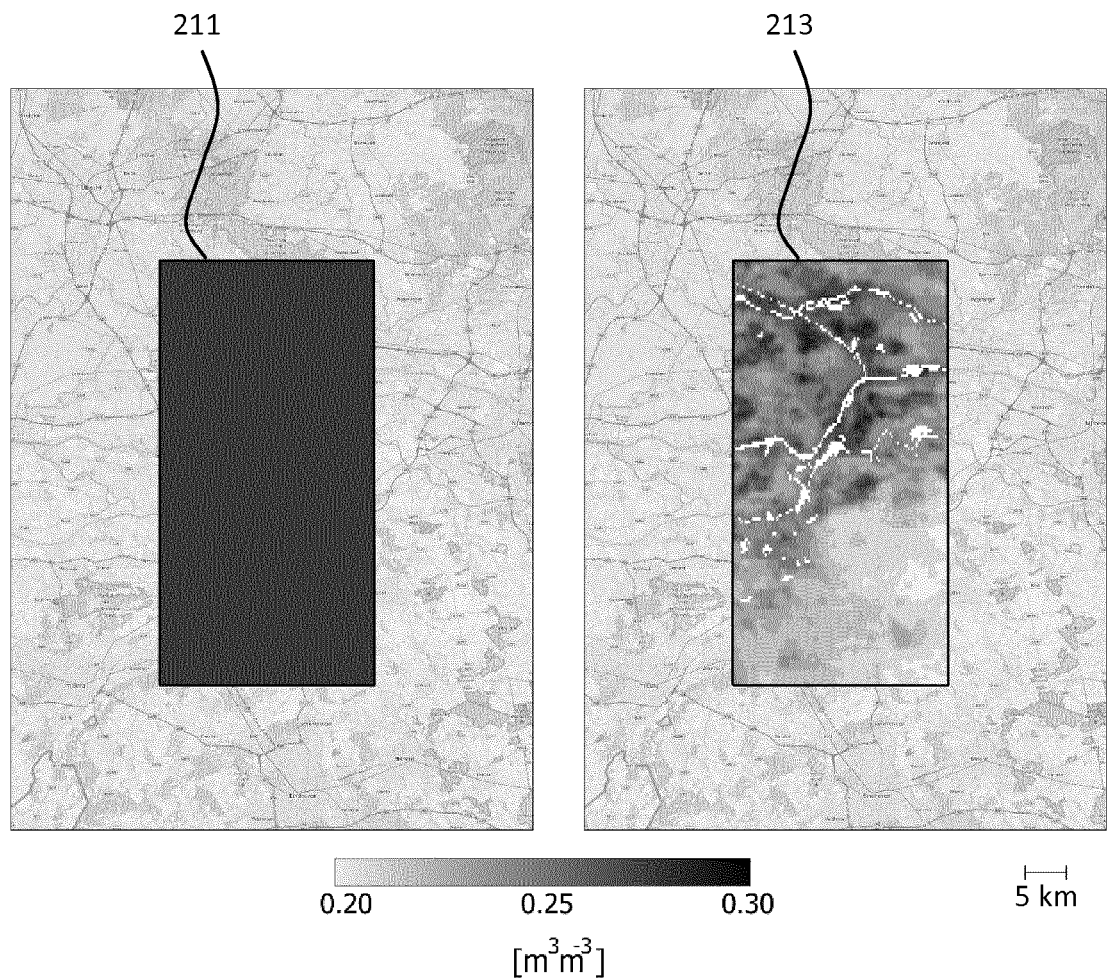
FIG. 17 shows a comparison of the resolution of FIGS. 14 and 15.
Figure 18:
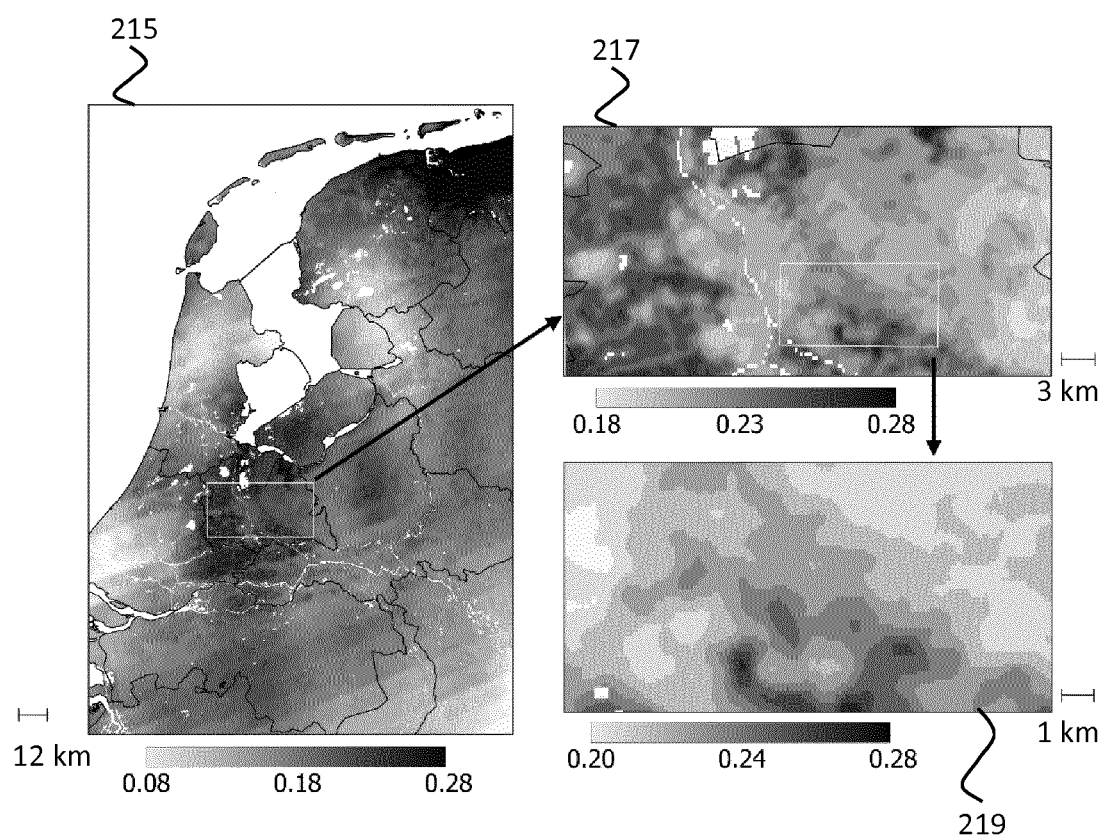
FIG. 18 shows an example of the resolution obtained with an embodiment of the method of the invention.

FIG. 15 depicts soil moisture data derived from sensor data determined with the methods of FIGS. 1 and 3. FIG. 16 depicts SMAP Level 3 soil moisture data. FIG. 17 shows a comparison of the resolution of FIGS. 15 and 16. As can be seen in FIGS. 15 to 17, SMAP level 3 soil moisture data only has a resolution of 36 km×36 km, while the soil moisture data derived from sensor data determined with the methods of FIGS. 1 and 3 has a resolution of 100 m×100 m. The benefit of the invention is especially clear when comparing SMAP Level 3 soil moisture data with regard to area 211 (having only a single value) with soil moisture data determined with the methods of FIGS. 1 and 3 with regard to the corresponding area 213. The high resolution that can be achieved by applying the invention is even clearer in FIG. 18. Soil moisture data 217 (in $m^3\ m^{-3}$), which relates to a different part of the Netherlands than area 213 of FIG. 17, is an enlarged version of a part of soil moisture data 215. Soil moisture data 219 is an enlarged version of a part of soil moisture data 217.

Figure 19:
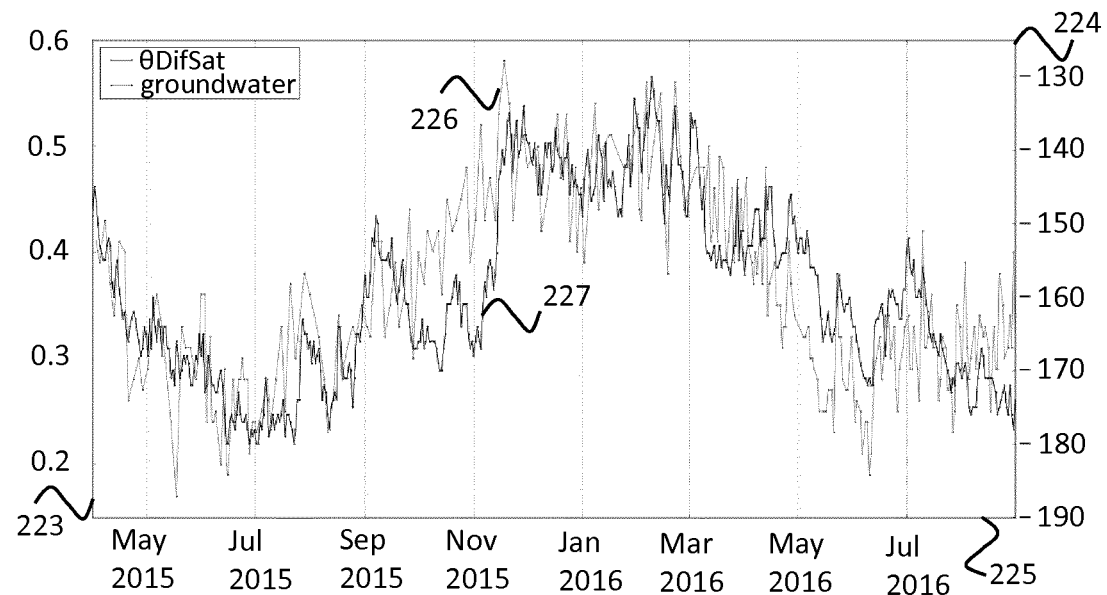
FIG. 19 shows soil moisture values determined with an embodiment of the method of the invention compared to measured groundwater levels.

FIG. 19 demonstrates that the improved resolution obtained by using the method of the invention produces accurate results and is indeed more useful than the sensor data obtained using prior art methods with a resolution of 36 km×36 km, 25 km×25 km or 1 km×1 km. FIG. 19 compares soil moisture values (10 days running average) determined with the methods of FIGS. 1 and 3 (line 226) over a period of 1½ years for 251 locations with groundwater levels (line 227) measured over the same period for the same locations. Time is represented on the x-axis 225. The soil moisture values and ground water levels are represented on the y-axis. The scale of the soil moisture levels is indicated at left side 223 (in $m^3\ m^{-3}$). The scale of the groundwater levels (with respect to the ground surface; in cm) is indicated at right side 224. The groundwater levels were obtained from the subsurface data service of Netherlands, which is hosted by the Dutch institute of Applied Sciences (TNO DINOloket, https://www.dinoloket.nl). It is evident from FIG. 19 that there is a high correlation between these soil moisture values and the groundwater levels.

Figure 20:
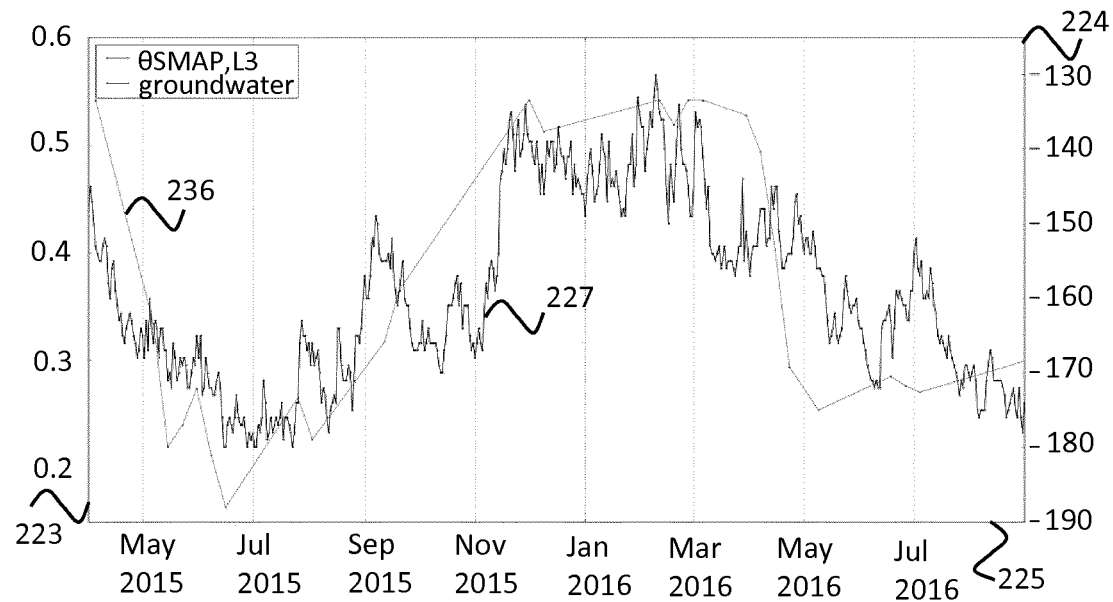
FIG. 20 shows soil moisture values determined with a prior art method compared to measured groundwater levels.

FIG. 20 compares the groundwater levels of FIG. 19 (line 227) with SMAP Level 3 soil moisture values (line 236). It is evident from FIG. 20 that the correlation between the SMAP Level 3 soil moisture values and the groundwater level is not as high as the correlation between the soil moisture values determined with the methods of FIGS. 1 and 3 and the groundwater levels.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A computer-implemented method of improving the spatial resolution of sensor data, comprising at least one processor performing the steps of:
   receiving a sensor data set, each element of said sensor data set comprising a sensor footprint identifier allowing a sensor footprint to be identified and a brightness temperature measured for said sensor footprint;
   receiving a map, said map defining for each of a plurality of geographical areas whether it belongs to one of a first class and a second class, said first class representing a land type, said second class representing a water type and said geographical area being smaller than said sensor footprint;
   determining for each element of said sensor data set a brightness temperature for the first class and a brightness temperature for the second class based on said map; and
   determining a brightness temperature for a geographical area of said map based on brightness temperatures associated with a plurality of footprints if said geographical area belongs to said first class, each of said plurality of footprints covering said geographical area, and based on a brightness temperature determined for said second class if said geographical area belongs to said second class
   wherein the step of determining for each element of said sensor data set said brightness temperature for said first class and said brightness temperature for said second class comprises:
   determining a brightness temperature for said second class from a plurality of percentages, said plurality of percentages comprising for each of a plurality of elements of said sensor data set a percentage of at least one footprint associated with said element belonging to said first class and a percentage of said at least one footprint belonging to said second class, and from brightness temperatures associated with said plurality of elements, and determining for each element of said plurality of elements a brightness temperature for said first class based on said brightness temperature for said second class, said brightness temperature measured for said element, a percentage of at least one footprint associated with said element belonging to said first class and a percentage of said at least one footprint belonging to said second class.

2. The method as claimed in claim 1, wherein the step of determining for each element of said sensor data set said brightness temperature for said first class and said brightness temperature for said second class comprises determining, for each element of said sensor data set, which geographical areas of said map both belong to said first class and are covered by a plurality of footprints associated with said element and which geographical areas of said map both belong to said second class and are covered by said plurality of footprints associated with said element, wherein a geographical area present in a smaller footprint has a higher weight than a geographical area present in a larger footprint in determining a percentage of said at least one footprint belonging to said first class and a percentage of said at least one footprint belonging to said second class.

3. The method as claimed in claim 1, wherein determining said brightness temperature for said geographical area of said map based on said brightness temperatures associated with said plurality of footprints if said geographical area belongs to said first class comprises assigning a higher weight to a brightness temperature associated with a smaller one of said plurality of footprints and a smaller weight to a brightness temperature associated with a larger one of said plurality of footprints.

4. The method as claimed in claim 1, wherein the step of determining for each element of said sensor data set said brightness temperature for said first class and said brightness temperature for said second class comprises determining for each element of said sensor data set, for each of at least one footprint associated with said element, a percentage of geographical areas belonging to said first class which are covered by said footprint arid a percentage of geographical areas belonging to said second class which are covered by said footprint.

5. The method as claimed in claim 4, wherein said at least one footprint comprises a plurality of footprints and the step of determining for each element of said sensor data set said brightness temperature for said first class and said brightness temperature for said second class further comprises determining for each element of said sensor data set an average percentage of geographical areas belonging to said first class and an average percentage of geographical areas belonging to said second class from said percentages determined for each of said plurality of footprints.

6. A computer readable medium for storing instructions when executed on a computer system, perform a method comprising:
receiving a sensor data set, each element of said sensor data set comprising a sensor footprint identifier allowing a sensor footprint to be identified and a brightness temperature measured for said sensor footprint;
receiving a map, said map defining for each of a plurality of geographical areas whether it belongs to one of a first class and a second class, said first class representing a land type, said second class representing a water type and said geographical area being smaller than said sensor footprint;
determining for each element of said sensor data set a brightness temperature for the first class and a brightness temperature for the second class based on said map; and
determining a brightness temperature for a geographical area of said map based on brightness temperatures associated with a plurality of footprints if said geographical area belongs to said first class, each of said plurality of footprints covering said geographical area, and based on a brightness temperature determined for said second class if said geographical area belongs to said second class
wherein the step of determining for each element of said sensor data set said brightness temperature for said first class and said brightness temperature for said second class comprises:
determining a brightness temperature for said second class from a plurality of percentages, said plurality of percentages comprising for each of a plurality of elements of said sensor data set a percentage of at least one footprint associated with said element belonging to said first class and a percentage of said at least one footprint belonging to said second class, and from brightness temperatures associated with said plurality of elements, and
determining for each element of said plurality of elements a brightness temperature for said first class based on said brightness temperature for said second class, said brightness temperature measured for said element, a percentage of at least one footprint associated with said element belonging to said first class and a percentage of said at least one footprint belonging to said second class.

7. The computer readable medium as claimed in claim 6, wherein the step of determining for each element of said sensor data set said brightness temperature for said first class and said brightness temperature for said second class comprises determining, for each element of said sensor data set, which geographical areas of said map both belong to said first class and are covered by a plurality of footprints associated with said element and which geographical areas of said map both belong to said second class and are covered by said plurality of footprints associated with said element, wherein a geographical area present in a smaller footprint has a higher weight than a geographical area present in a larger footprint in determining a percentage of said at least one footprint belonging to said first class and a percentage of said at least one footprint belonging to said second class.

8. The computer readable medium as claimed in claim 6, wherein determining said brightness temperature for said geographical area of said map based on said brightness temperatures associated with said plurality of footprints if said geographical area belongs to said first class comprises assigning a higher weight to a brightness temperature associated with a smaller one of said plurality of footprints and a smaller weight to a brightness temperature associated with a larger one of said plurality of footprints.

9. The computer readable medium as claimed in claim 6, wherein the sensor data set is received from a satellite or drone.

10. The computer readable medium as claimed in claim 6, wherein the sensor data set is suitable for determining soil moisture data.

11. The computer readable medium as claimed in claim 6, wherein the step of determining for each element of said sensor data set said brightness temperature for said first class and said brightness temperature for said second class comprises determining for each element of said sensor data set, for each of at least one footprint associated with, said element, a percentage of geographical areas belonging to said first class which are covered by said footprint and a percentage of geographical areas belonging to said second class which are covered by said footprint.

12. The computer readable medium as claimed in claim 11, wherein said at least one footprint comprises a plurality of footprints and the step of determining for each element of said sensor data set said brightness temperature for said first class and said brightness temperature for said second class further comprises determining for each element of said sensor data set an average percentage of geographical areas belonging to said first class and an average percentage of geographical areas belonging to said second class from said percentages determined for each of said plurality of footprints.

13. A system for improving the spatial resolution of sensor data, comprising:
   at least one receiver; and
   at least one processor configured:
      to use said at least one receiver to receive a sensor data set, each element of said sensor data set comprising a sensor footprint identifier allowing a sensor footprint to be identified and a brightness temperature measured for said sensor footprint,
      to use said at least one receiver to receive a map, said map defining for each of a plurality of geographical areas whether it belongs to one of a first class and a second class, said first class representing a land type, said second class representing a water type and said geographical area being smaller than said sensor footprint,
      to determine for said each element of said sensor data set a brightness temperature for each of at least two classes including said first class and said second class based on said map, and
      to determine a brightness temperature for a geographical area of said map based on brightness temperatures associated with a plurality of footprints if said geographical area belongs to said first class, each of said plurality of footprints covering said geographical area, and based on a brightness temperature determined for said second class if said geographical area belongs to said second class,
   wherein said at least one processor is configured to determine for said each element of said sensor data set said brightness temperature for each of said at least two classes by:
      determining a brightness temperature for said second class from a plurality of percentages, said plurality of percentages comprising for each of a plurality of elements of said sensor data set a percentage of at least one footprint associated with said element belonging to said first class and a percentage of said at least one footprint belonging to said second class, and from brightness temperatures associated with said plurality of elements, and
      determining for each element of said plurality of elements a brightness temperature for said first class based on said brightness temperature for said second class, said brightness temperature measured for said element, a percentage of at least one footprint associated with said element belonging to said first class and a percentage of said at least one footprint belonging to said second class.

14. The system as claimed in claim 13, wherein determining for each element of said sensor data set said brightness temperature for said first class and said brightness temperature for said second class comprises determining, for each element of said sensor data set, which geographical areas of said map both belong to said first class and are covered by a plurality of footprints associated with said element and which geographical areas of said map both belong to said second class and are covered by said plurality of footprints associated with said element, wherein a geographical area present in a smaller footprint has a higher weight than a geographical area present in a larger footprint in determining a percentage of said at least one footprint belonging to said first class and a percentage of said at least one footprint belonging to said second class.

15. The system as claimed in claim 14, determining for each element of said sensor data set said brightness temperature for said first class and said brightness temperature for said second class comprises determining for each element of said sensor data set, for each of at least one footprint associated with said element, a percentage of geographical areas belonging to said first class which are covered by said footprint and a percentage of geographical areas belonging to said second class which are covered by said footprint.

16. The system as claimed in claim 15, wherein said at least one footprint comprises a plurality of footprints and the step of determining for each element of said sensor data set said brightness temperature for said first class and said brightness temperature for said second class further comprises determining for each element of said sensor data set an average percentage of geographical areas belonging to said first class and an average percentage of geographical areas belonging to said second class from said percentages determined for each of said plurality of footprints.

17. The system as claimed in claim 16, wherein determining said brightness temperature for said geographical area of said map based on said brightness temperatures associated with said plurality of footprints if said geographical area belongs to said first class comprises assigning a higher weight to a brightness temperature associated with a smaller one of said plurality of footprints and a smaller weight to a brightness temperature associated with a larger one of said plurality of footprints.

18. The system as claimed in claim 17, wherein the receiver is configured to receive sensor data set is received from a satellite or drone.

* * * * *